April 27, 1965     W. B. HUCKABAY ETAL     3,181,155
POSITION DETERMINING SYSTEM
Filed Sept. 11, 1959     13 Sheets-Sheet 1

INVENTORS
W. B. HUCKABAY &
W. H. PARKER
BY
ATTORNEY

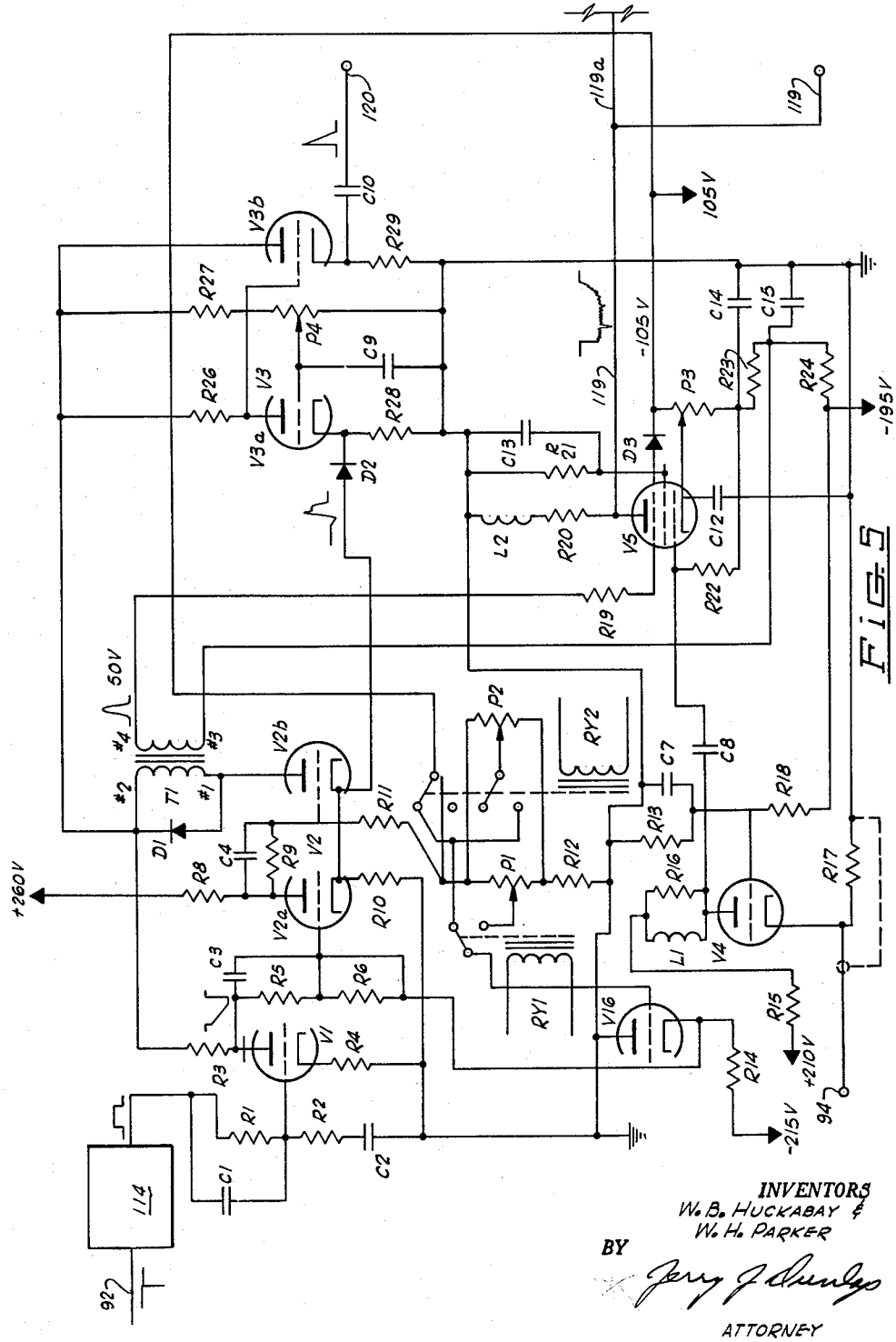

INVENTORS
W. B. HUCKABAY &
W. H. PARKER
BY
Jerry J Dunlap
ATTORNEY

April 27, 1965   W. B. HUCKABAY ETAL   3,181,155
POSITION DETERMINING SYSTEM
Filed Sept. 11, 1959   13 Sheets-Sheet 8

INVENTORS
W. B. HUCKABAY &
W. H. PARKER
BY
ATTORNEY

April 27, 1965  W. B. HUCKABAY ETAL  3,181,155
POSITION DETERMINING SYSTEM
Filed Sept. 11, 1959  13 Sheets-Sheet 10

INVENTORS
W. B. HUCKABAY &
W. H. PARKER
BY
ATTORNEY

INVENTORS
W. B. HUCKABAY &
W. H. PARKER
BY
ATTORNEY 3,181,155
POSITION DETERMINING SYSTEM
William B. Huckabay and William H. Parker, Dallas, Tex., assignors, by mesne assignments, to Rayflex Exploration Company, Dallas, Tex., a corporation of Texas
Filed Sept. 11, 1959, Ser. No. 839,353
19 Claims. (Cl. 343—15)

This invention relates generally to improvements in the art of determining the position of a station which, for example, may be on land, on the sea, or in the air, and more particularly, but not by way of limitation, to a novel system for continuously determining the position of a surveying ship used in marine seismic operations.

As it is well known in the exploration division of the oil industry, there has been a substantial amount of exploration activity in recent years directed toward locating potential oil deposits underlying the ocean, and particularly in areas adjacent the shoreline of the United States. One of the most important exploration tools is the use of the seismic technique wherein energy sources, such as dynamite, are detonated in the water and the resulting seismic waves reflected by strata underlying the water are received by suitable detectors in the water to obtain an indication of the structure of the sub-strata. In a typical marine seismic operation, the seismic energy sources and the detectors are towed by a surveying ship, and the seismic signals are alternately transmitted through the water and received by the detectors as the ship is navigated along a pre-determined course, such that the resulting seismic records may be correlated with other records taken in the immediate vicinity. In other words, if the precise position of the surveying ship is not known each time a seismic record is made, the records taken in a locality cannot be correctly correlated, and the structure of the sub-strata underlying any appreciable portion of the ocean cannot be correctly analyzed. As a result, many prior efforts have been made to determine and record or plot the various positions of a seismic surveying ship during a survey.

Many prior workers in the art have devised radio types of navigation systems for tracking the surveying ship, but in all of these systems a substantial amount of intricate and expensive equipment is required and the results obtained are not as precise as is desired. Many of the surveying ships also utilize radar for continuously determining the position of the ship by taking distance and azimuth measurements visually from the PPI indicator of the radar and plotting this information on a suitable map. However, and as it is well known, the measurements of distance and azimuth which may be visually observed on a PPI indicator are only approximate, and the precise position of the ship cannot be obtained in this manner.

The travel time of signals transmitted from a radar antenna and reflected back to the radar antenna by available targets does provide an accurate indication of the distance of the ship from the reflecting targets. However, prior to the present invention, these signals could not be fed through a precise time-measuring means since signals are reflected from any targets within the range of the radar, and the only means for distinguishing between the various reflected signals has been by the use of the PPI indicator wherein the operator may visually select which targets are being utilized for distance measurements.

The present invention contemplates a novel system for determining the position of a surveying ship wherein the precise distance of the ship from a pair of spaced targets (preferably located on shore) is substantially continuously measured, such that the two distance measurements may be utilized to precisely plot the position of the ship on a map of the area. It will be apparent that the precise position of the targets must be known and this requirement may be easily satisfied by locating special targets along the shore and plotting their positions on a map of the area. The distance measurements are obtained by alternately transmitting pulse-type signals toward the known targets and precisely measuring the travel times of the signals reflected only from the targets. Since the velocity of the signals through air is known, the distance of the ship from the targets may be precisely determined from the travel times of the signals.

The present invention may be broadly defined as a system for determining the position of a station with respect to a pair of spaced targets, comprising means for determining the approximate range and direction of the targets from the station, means for alternately transmitting a series of pulse-type signals from the station towards each of the targets and for receiving those signals reflected to the station, time measuring means, means for starting the time measuring means simultaneous with the transmission of one of said signals of each series, means for stopping the time measuring means upon the receipt at the station of a reflected signal of the respective series of signals which arrives at the station at a time spaced from the respective starting of the time measuring means corresponding to approximately twice the expected travel time of a signal between the station and the respective target, and means for registering the time measurement of the time measuring means, from which the precise position of the station with respect to the targets may be determined.

In one embodiment of the present invention we utilize the transmitter and receiver portions of a radar system for alternately transmitting pulse-type signals towards the targets and receiving the signals reflected from the targets. A time measuring means in the nature of a stopwatch is combined with the transmitter and receiver portion of the system for measuring the time between the transmission of a signal towards one of the targets and the receipt of the signal reflected from the respective target. In this connection it may also be noted that the time measuring means is combined with the transmitter and receiver portion of the system in such a manner that only those signals reflected to the antenna from the immediate vicinity of the desired targets are utilized in the time measurements. In other words, the present system ignores all signals reflected to the transmitting station from unknown or undesired targets, such that the time measurements are taken only with respect to the signals reflected from the desired targets.

Furthermore, the present invention contemplates the averaging of several time measurements during the time the antenna of the transmitter and receiving system is directed towards each of the targets, such that the maximum accuracy in the time measurements is obtained, and hence the maximum accuracy in the position of the transmitting station is obtained.

The present invention also contemplates a novel plotter wherein the distance measurements are utilized to automatically plot the position of a ship on a map of the area being surveyed, such that an accurate visual record of the course along which the ship has traveled is maintained as a permanent record and may be utilized to correlate seismic records in the immediate vicinity.

An important object of this invention is to improve the efficiency and accuracy of marine seismic surveys.

Another, and more general, object of this invention is to accurately determine the position of a station which may be located either on land, on water, or in the air.

Another object of this invention is to accurately determine the position of a station with respect to two known targets spaced at various directions and distances from the station, wherein the precise distance of the station from each of the targets is measured, from which the precise position of the station may be determined.

A further object of this invention is to accurately measure the travel time of a signal transmitted from a station to a particular target and reflected by the target back to the station, even though various unknown targets or undesired targets are located in the general vicinity of the desired target and are reflecting signals back to the station at the same time as the desired target.

Another object of this invention is to provide a system for continuously determining the position of a ship wherein the system utilizes a large portion of the navigation equipment normally existing on the ship. More specifically, an object of this invention is to utilize the transmitter and receiver portion of a radar system installed aboard a ship for transmitting and receiving signals which are utilized in the system for time measurements, from which distance measurements may be determined.

Another object of this invention is to automatically obtain an average of several signal travel times between a station and a known reflecting target, such that an accurate time measurement may be obtained.

A further object of this invention is to provide a novel plotter for continuously plotting the position of a mobile station on a map from signals representing distance measurements.

A still further object of this invention is to provide a novel system for determining the position of a station with respect to a pair of spaced targets which is simple in construction, which may be easily and economically operated, and which may be economically manufactured.

Other objects and advantages of the invention will be evident from the following detailed description, when read in conjunction with the accompanying drawings which illustrate our invention.

In the drawings:

FIGURE 5 is a wiring diagram of the major portion of the range control device.

FIGURE 8 is a schematic illustration of the preferred selector switch.

FIGURE 17 is a wiring diagram of the modifications of a time measuring device to obtain an average of several travel time measurements.

Figure 1:
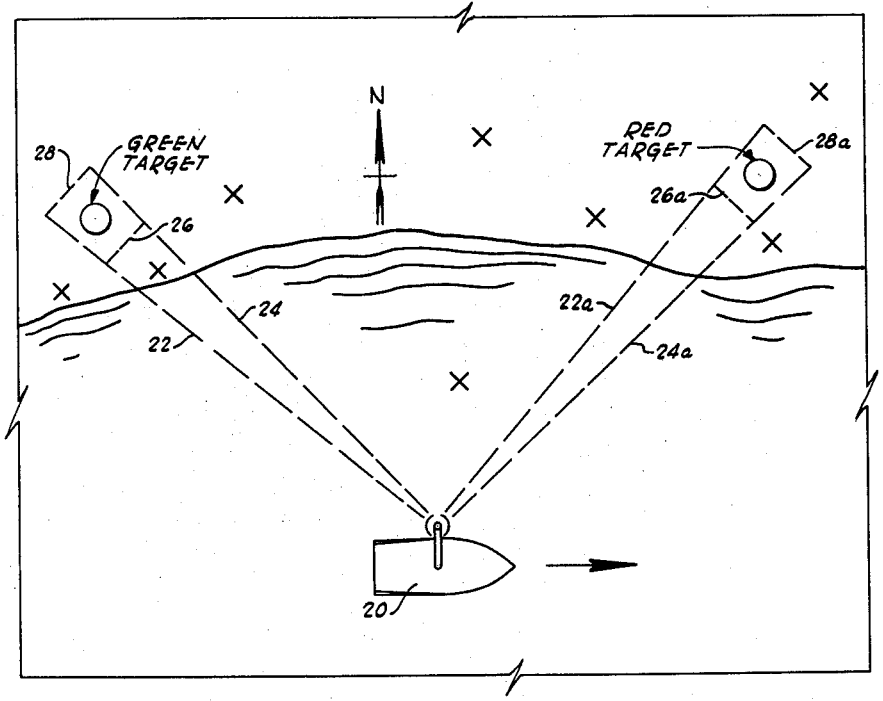
FIGURE 1 is a schematic drawing in the nature of a map illustrating one use of the present invention.

Before proceeding with a detailed description of a preferred embodiment of the present invention, reference should first be made to FIG. 1 which illustrates some of the problems involved in determining the position of a seismic surveying ship 20 utilizing the transmission of signals from the ship and the reflection of these signals back to the ship, particularly when the ship is being navigated adjacent a shoreline. In the present system, the precise positions of a pair of spaced targets which have been designated green target and red target on FIG. 1 are known, and it will be apparent that, if these two targets are the only targets available for reflecting signals to the ship 20, the travel times of signals to and from the targets could be measured without extreme difficulty. However, there are invariably many unknown or undesired targets in the general locality of the desired targets (as indicated by X marks in FIG. 1), which also provide reflections of signals back to the ship 20. It may also be noted that these undesired targets are frequently either between the ship 20 and the desired targets, or substantially in line with the ship and the desired targets.

In order to minimize the possibility of obtaining erroneous time measurements which would be caused by signals reflected to the ship from these various unknown and undesired targets, we utilize only those signals reflected to the ship 20 from targets positioned in the immediate vicinity of the green and red targets. This result is obtained by, in effect, ignoring all signals reflected to the ship except those signals which are reflected from targets located between azimuths 22 and 24 and distance lines 26 and 28 associated with the green target, and azimuths 22a and 24a and distance lines 26a and 28a associated with the red target. In other words, we utilize only those signals reflected to the ship which could have been reflected by targets within the areas bounded by the lines 22, 24, 26 and 28 or 22a, 24a, 26a and 28a associated with the respective green and red targets, which involves both azimuth and range controls, such that the possibility of obtaining erroneous time or distance measurements is greatly minimized. Obviously, to obtain these azimuth and range controls the approximate directions and distances of the green and red targets from the ship 20 must be known. However, since any ship is provided with some sort of navigation equipment, these approximate directions and distances may be easily determined.

As previously indicated, it is also preferred that the green and red targets be of special construction and precisely located in the desired positions before a surveying operation, although natural, existing targets may be used if they provide good reflecting surfaces and are easily and accurately located on a map of the area. When specially constructed targets are utilized for the green and red targets, the signals transmitted from the ship 20 may be polarized in a given direction, such as vertically, and the reflecting surfaces of the specially constructed targets may be easily formed to provide reflection only of signals polarized in the required direction, such that the green and red targets will provide distinct reflected signals which may be more easily distinguished from other reflected signals and from which time measurements may be accurately made.

Figure 2:
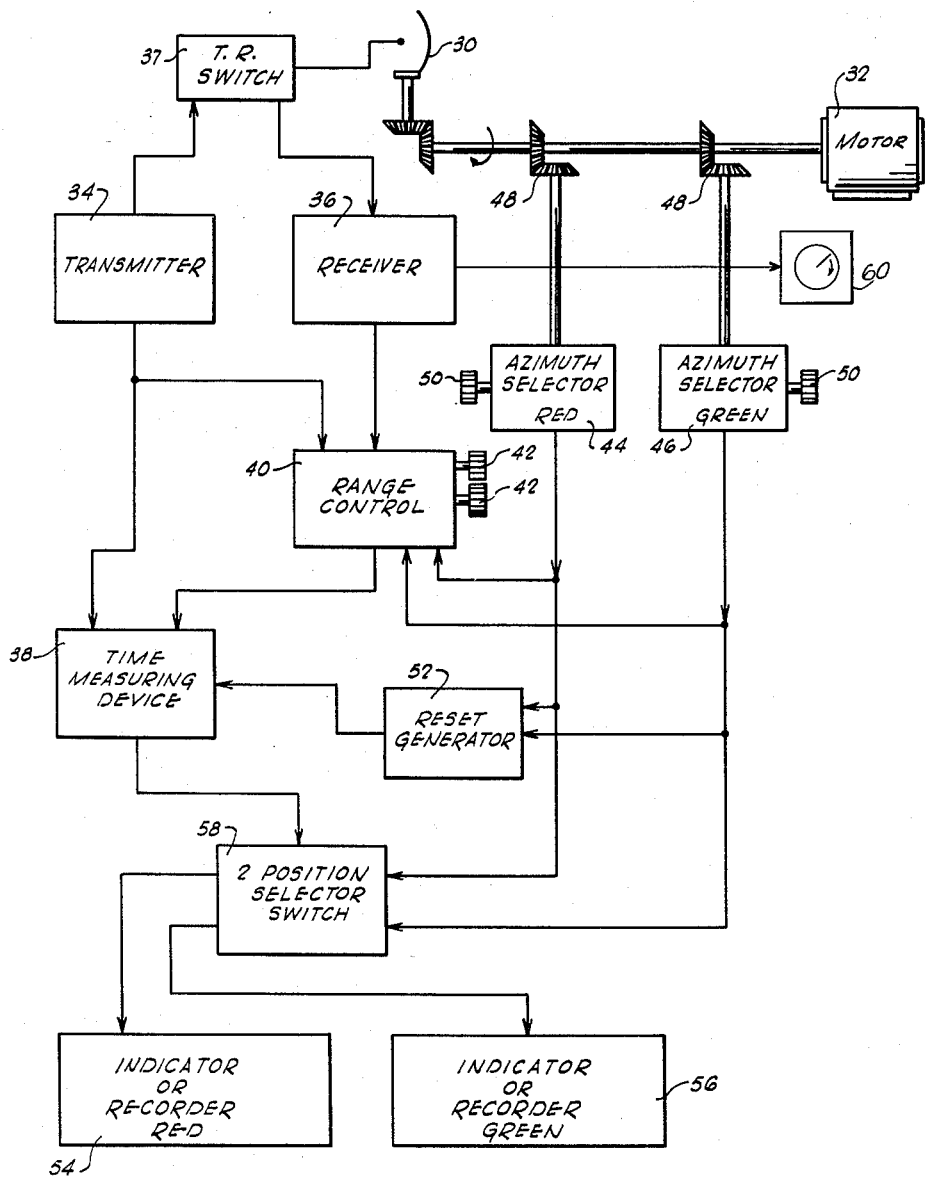
FIGURE 2 is a schematic illustration of one embodiment of this invention.

As shown in FIG. 2, the present system basically comprises a suitable transmitting and receiving directional antenna 30 mounted on the surveying ship and which is preferably constructed for rotation through a 360 degree arc, as by use of a suitable motor 32. Signals are fed to the antenna 30 from a suitable transmitter 34, and the signals received by the antenna 30 are fed to a suitable receiver 36, with the signals being transmitted by the transmitter 34 and received by the receiver 36 being controlled by a transmitter-receiver switch 37 (commonly known as a TR switch). The TR switch 37 provides a transmission of a signal by the antenna 30 and then the feeding of a reflected signal from the antenna to the receiver 36 in an alternating manner, and as is conventional in present day radar systems. The antenna 30, transmitter 34, receiver 36 and TR switch 37 may be a portion of substantially any radar system, such as a Raytheon 1500 radar, commonly known as a Pathfinder.

In accordance with the present invention, the transmitter 34 transmits a pulse type signal to a time measuring device 38 each time a signal is sent from the transmitter 34 through the TR switch 37 to the antenna 30. These pulse type signals fed by the transmitter 34 to the time measuring device 38 will be hereafter referred to as "start" pulses and are utilized to start operation of the time measuring device 38, as will be more fully hereinafter set forth. Also, each time a reflected signal is fed from the antenna 30 through the TR switch 37 to the receiver 36, the receiver 36 sends a signal to a range control device 40, which in turn sends a pulse to the time measuring device 38 for stopping the time measuring device when the reflected signal has been reflected from the immediate vicinity of one of the desired targets, as will also be more fully hereinafter set forth. The pulses fed from the range control device 40 to the time measuring device 38 will be hereafter called "stop" pulses, since they are utilized to stop the time measuring operation of the device 38.

The time measuring device 38 may be any suitable mechanism which will measure the time between the reception of a start pulse from the transmitter 34 and a stop pulse from the range control device 40, and which may be reset. We prefer to use a time interval meter for the device 38 which will hold a total count after receiving a stop pulse and which is not affected by subsequent start or stop pulses until it is reset. After the time interval meter is reset, it starts counting upon receipt of the next subsequent start pulse. For example, we may use a No. 524B electronic counter with a model 526B time interval unit manufactured by the Hewlett-Packard Company of Palo Alto, California. The resetting of the device 38 will be described below.

The range control device 40 may be any suitable time set gating circuit which will feed a stop pulse to the device 38 in response to signals received from the receiver 36 only when the time of receipt of a reflected signal corresponds to approximately twice the expected travel time of the respective signal from the antenna 30 to one of the desired targets, and only when the respective reflected signal is received from the approximate direction of one of the desired targets. The travel time controls are adjusted by suitable knobs 42, and the direction controls of the device 40 are set by signals received from a pair of azimuth selectors 44 and 46.

Both of the selectors 44 and 46 are driven by the motor 32 through suitable gears 48 and each selector has a control knob 50 to control the times when signals are fed from the respective selector to the range control device 40. Each of the selectors 44 and 46 is provided for one of the desired targets. For example, the selector 44 may be provided for the red target and the selector 46 may be provided for the green target. Each selector 44 and 46 operates to energize the range control device 40 when the antenna 30 is directed toward the respective target, such that the range control device 40 will feed stop pulses to the time measuring device 38 only when the antenna 30 is directed toward one or the other of the desired targets. Thus, the time measuring device 38 will be operative only with respect to signals reflected to the antenna from targets within the areas bounded by the azimuth lines 22 and 24, 22a and 24a as illustrated in FIG. 1 and as previously described.

The selectors 44 and 46 are also utilized to energize a reset generator 52 which feeds reset signals to the time measuring device 38. The reset generator 52 operates to feed a reset signal to the time measuring device 38 each time the antenna 30 is directed toward one of the desired targets, such that the device 38 will start measuring time as soon as the first start pulse is fed thereto when the antenna 30 is directed toward one of the targets. As previously indicated, the time measuring device 38 operates only until a stop pulse is fed thereto and will hold a total count until it is reset. Thus, the time measuring device 38 will measure the travel time of signals transmitted from the antenna 30 and reflected back to the antenna only when the signals are reflected at a range approximately equal to the estimated range of the desired target (as set by the control knobs 42 on the range control device 40) and only during the time the antenna 30 is directed toward one of the targets (as controlled by the selectors 44 and 46 through the range control device 40 and reset generator 52). As a result, the time measuring device 38 measures the travel time of signals which are reflected from targets bounded by the lines 22, 24, 26 and 28 associated with the green target and the lines 22a, 24a, 26a and 28a associated with the red target as indicated in FIG. 1 and as previously described.

The time measurements provided by the device 38 are fed to either one or the other of a pair of registering devices 54 or 56. The devices 54 and 56 may be either in the form of indicators or recorders for the respective time measurements received thereby, and each of these devices is associated with one of the desired red or green targets. For example, the device 54 may be provided for the red target and the device 56 provided for the green target. In one embodiment of this invention, the time measurements may be fed from the device 38 through a two position selector switch 58 controlled by the selectors 44 and 46, such that each time measurement will be fed to the respective device 54 or 56, depending upon whether the respective time measurement is taken with respect to the red or with respect to the green target.

The approximate positions of the targets (for use in setting the control knobs 42 and 50) may be determined by means of a cathode ray tube 60 of a PPI indicator connected to the receiver 36.

In summarizing the present system as illustrated in FIG. 2, it will be observed that the antenna 30 is continuously rotated through an arc of 360 degrees by the motor 32. The antenna 30 functions to alternately transmit pulse type signals by operation of the transmitter 34 and TR switch 37, and receive reflected signals, with the reflected signals being fed through the TR switch 37 to the receiver 36. In other words, the antenna 30, transmitter 34, receiver 36 and TR switch 37 operate in the same manner as a present day radar system to alternately transmit pulse type signals and receive signals which may be reflected from any target back to the antenna, with no discrimination being made between the targets which reflect the signals back to the antenna. Each time a signal is transmitted from the transmitter 34 and the antenna 30, a start pulse is fed to the time measuring device 38. However, these start pulses are effective in starting the operation of the time measuring device 38 only when the time measuring device is reset.

Each time a reflected signal is received by the receiver 36, a signal is fed to the range control device 40 to provide a stop pulse for the time measuring device 38, providing certain conditions are met. One condition is that before the range control device 40 will feed a stop pulse to the time measuring device 38, the reflected signal received by the receiver 36 must have a travel time approximately equal to the expected travel time of a reflected signal from one of the desired targets, as controlled by the setting of the knobs 42. In this connection it will be noted that the control knobs 42 may be set in any desired manner, such as manually, for each of the red and green targets, since the range of these targets from the antenna 30 may be different. The other condition for feeding a stop pulse from the range control device 40 to the time measuring device 38 is that the reflected signal be received from the direction of one of the desired targets, as controlled by the selectors 44 and 46. That is, when the antenna 30 is directed toward the red target, the selector 44 energizes the range control device 40, and when the antenna 30 is directed toward the green target the selector 46 energizes the range control device 40. Thus, the reflected signals will give rise to stop pulses only when the reflected signals are received from targets in the immediate vicinity of the red or green targets. It will also be observed that the time measuring device 38 is reset when the antenna is first directed toward either the red or green target, such that the device 38 will measure the time between the transmission of the first transmitted signal from the antenna 30 toward the respective target and the reception of the respective reflected signal from the target, and this time measurement or count will be held by the device 38 until the device is again reset.

The time measurements provided by the device 38 are fed to the respective indicators or recorders 54 or 56 through the two position selector switch 58, such that the precise distance from the antenna 30 to each of the red and green targets may be precisely determined. Hence, the precise position of the ship 20 with respect to the red and green targets may be determined.

Figure 3:
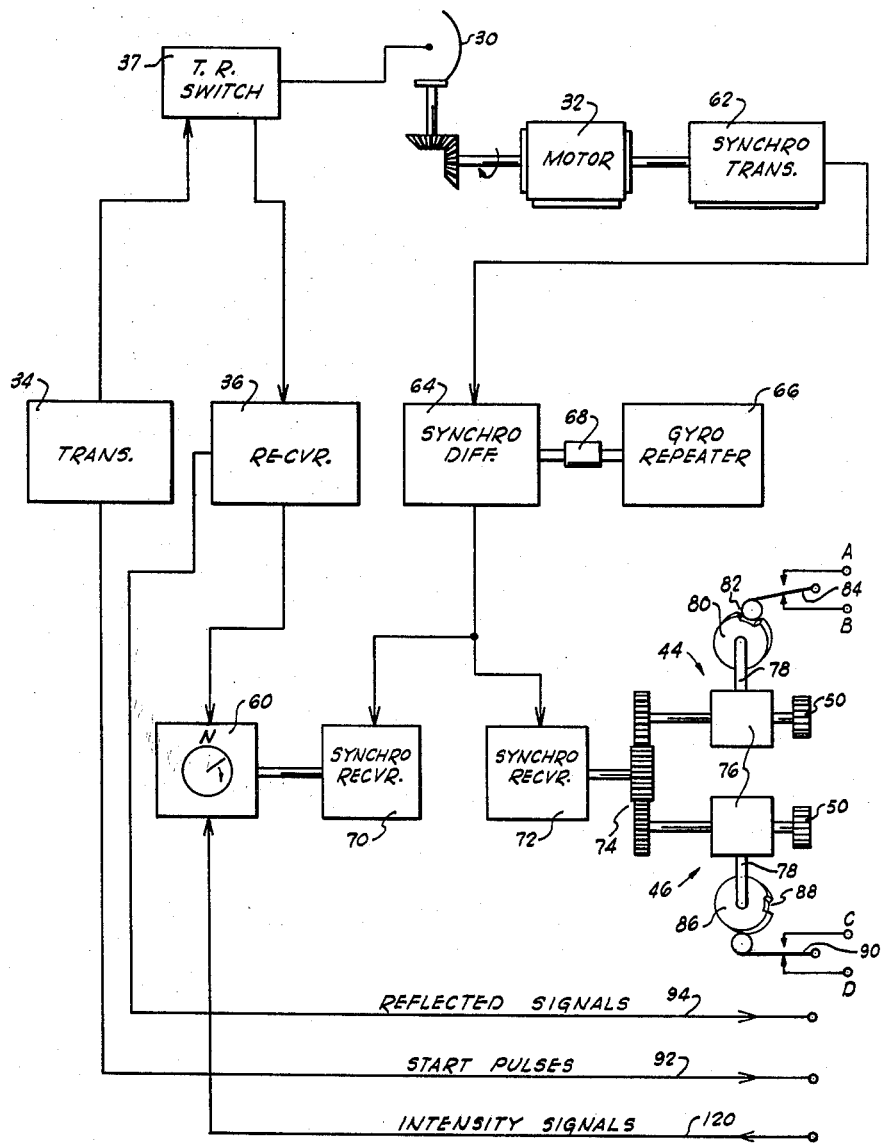
FIGURE 3 is a more detailed schematic illustration of a portion of the preferred system applied to marine seismic surveys.

A preferred embodiment of the present invention is illustrated in detail in FIGS. 3 through 16. Referring to FIG. 3 it will be observed that we utilize the antenna 30, motor 32 for driving the antenna, the transmitter 34, receiver 36 and TR switch 37 as previously described in connection with FIG. 2 and which may be a part of an existing radar system. In the preferred embodiment we also utilize the cathode ray tube 60 of the PPI indicator of the existing radar system connected to the receiver 36 for monitoring operation of the present system. It may also be noted that the display on the cathode ray tube 60 of the existing radar system may be utilized to obtain the approximate distances and directions of the red and green targets from the ship for setting the controls of the present system as previously indicated.

In this preferred embodiment, the motor 32 drives a synchro-transmitter 62 of any suitable type (such as a Navy Ordnance, size 3, 60 cycle transmitter) which provides an output signal representative of the movement of its input shaft, and hence representative of the movement of the antenna 30. The output signal from the synchro-transmitter 62 is fed to a synchro-differential 64 which is controlled by a gyro repeater 66 through a mechanical coupling 68. The synchro-differential generator 64 may be of any suitable type (such as a Naval Ordnance, size 3, differential synchro-generator) wherein the output signal thereof is representative of rotation of the antenna 30 related to true North as provided by the gyro repeater 66. The output signal from the synchro-differential generator 64 is fed to a pair of synchro-receivers 70 and 72, such that rotation of the output shafts of the receivers 70 and 72 are representative of rotation of the antenna 30. The synchro-receivers 70 and 72 may also be of any suitable type (such as Navy Ordnance, size 1, 60 cycle synchro-receivers) to mate with the synchro-differential generator 64 and the synchro-transmitter 62.

The receiver 70 drives the sweep beam of the cathode ray tube 60, such that the position of the sweep beam of the tube is related to the position of the antenna 30 at all times. In this connection it may be noted that when the gyro repeater 66 is used, the display on the cathode ray tube 60 is always maintained oriented in the same direction, as indicated by the N on the face of the tube in FIG. 3. The receiver 72 is utilized to drive both of the selectors 44 and 46 through suitable gearing 74, such that the selectors 44 and 46 are driven in response to the motor 32 and in accordance with the rotation of the antenna 30, as previously described in connection with FIG. 2.

Each of the selectors 44 and 46 comprises a mechanical differential gear assembly 76 having a pair of inputs, one of which is controlled by the knob 50 and the other of which is driven by the receiver 72 through the gearing 74. The output shaft 78 of each of the differential gears 76 is rotated in timed relation with the output of the receiver 72, with the relative angular positions of the shafts 78 being controlled by the knobs 50. A cam 80 is rigidly secured on the output shaft 78 of the selector 44 and has a depression 82 therein to operate the spring loaded arm of a two position switch 84. A similar cam 86 is secured on the output shaft 78 of the selector 46 and is provided with a depression 88 therein for operating another two position switch 90. It will thus be apparent that the relative angular positions of the cams 80 and 86 are controlled by the settings of the knobs 50, and that each of the cams will be rotated in timed relation with the rotation of the antenna 30.

The contacts of the switches 84 and 90 have been given a letter designation and will be referred to herein by the reference character of the switch followed by the respective letter designation. For example, the contacts of the switch 84 will be represented by the reference character 84A and 84B, and the contacts of the switch 90 will be referred to by the reference characters 90C and 90D to facilitate a following of the operation of the present system. It may also be noted in FIG. 3 that when the outer end of the switch arm of the switch 84 moves into the depression of the respective cam 80, the contact 84B will be closed and the contact 84A will be open. Also when the outer end of the arm of the switch 90 enters the depression 88 of the respective cam 86, the contact 90C will be closed and the contact 90D will be open. When the respective switch arms are out of the respective depressions, the opposite contacts will be closed, as will be readily understood. It may further be noted that each depression 82 and 88 is positioned to represent the direction of the respective red or green target from the antenna 30 and are so constructed that the respective switch will be operated by closing the contact 84B or 90D only while the antenna 30 is directed toward the respective target.

The lengths of the depressions 82 and 88 will depend upon the width of the beam transmitted by the antenna 30, which will in turn control the minimum width of the respective search area from which the desired reflected signals are received. For example, the width of the beam transmitted from the antenna 30 may, in a typical example, be two degrees, and the lengths of the depressions 82 and 88 will then be constructed to provide operation of the switches 84 and 90 while the antenna 30 is moving through an arc of slightly less than two degrees. In other words, if the beam of the antenna 30 is two degrees wide, the signals may be reflected from either of the desired targets only during a rotation of approximately two degrees of the antenna 30. Therefore, the lengths of the depressions 82 and 88 are set to operate the switches 84 and 90 during less than two degrees of rotation of the antenna 30, to assure that signals reflected by the desired targets may be utilized to generate stop pulses for the time measuring device 38, as previously indicated.

As also shown in FIG. 3, start pulses are fed from the transmitter 34 through a conductor designated by reference character 92, and reflected signals are transmitted from the receiver 36 through a conductor 94 in the same manner as previously described in connection with FIG. 2.

Figure 4:
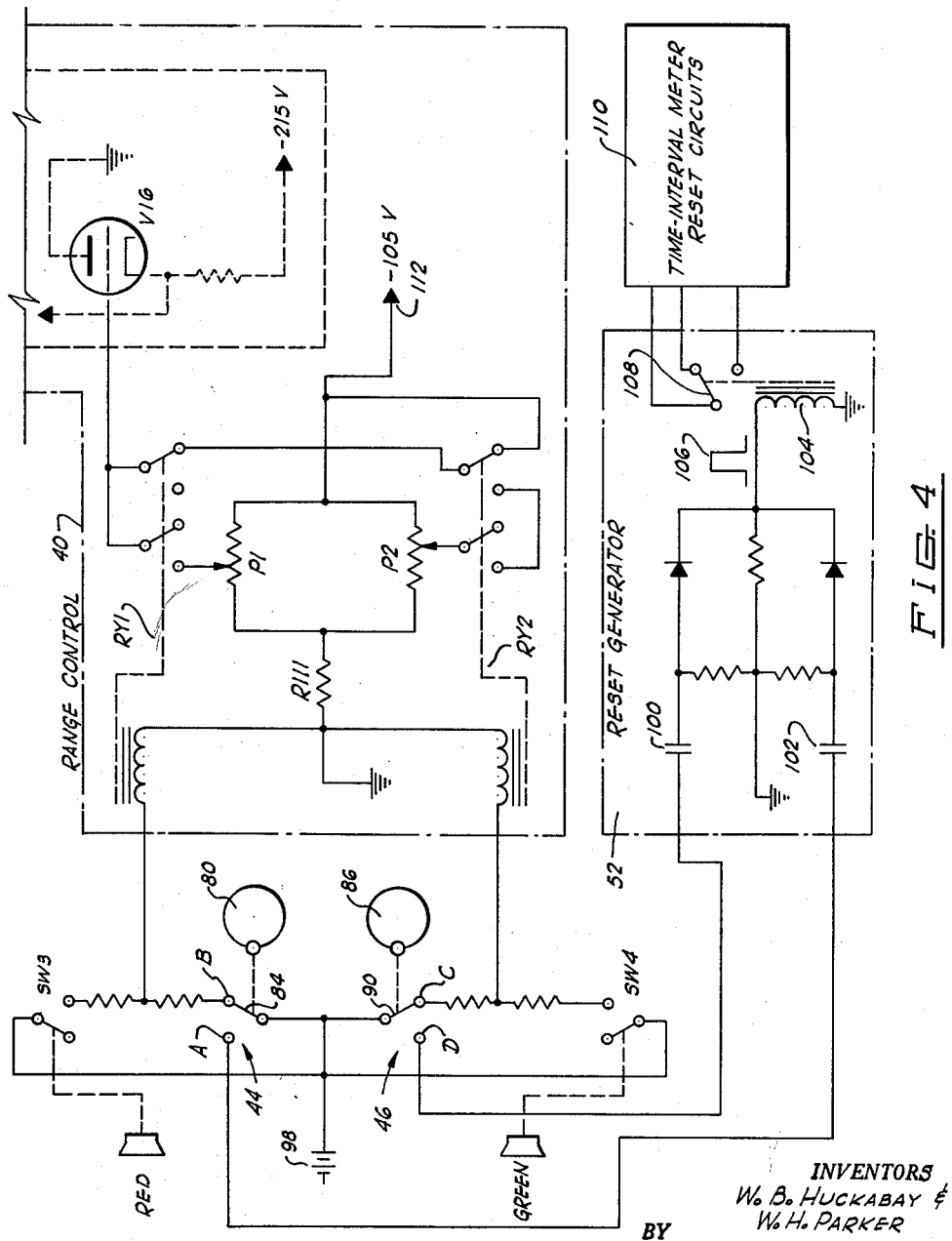
FIGURE 4 is a wiring diagram of a portion of the azimuth selectors, the reset generator used for resetting the time measuring device, and a portion of the range control device.

A more detailed illustration of a portion of the selectors 44 and 46, as well as the connections of the selectors 44 and 46 to the range control device 40 and the reset generator 52 are illustrated in FIG. 4. It will be observed that the contact 84A of the switch 84 is connected to one input of the reset generator 52, and the contact 90D of the switch 90 is connected to the other input of the reset generator. It will be recalled that the contacts 84A and 90D are closed when the respective switch arms are moved out of the depressions in the respective cams 80 or 86, which is immediately after the antenna 30 is directed at the respective desired targets. Thus, the reset generator 52 is provided with a positive D.C. signal from a source of D.C. energy 98 at one of the inputs thereof immediately after the antenna is first directed toward one of the desired targets. However, and as will be understood by those skilled in the art, the capacitors 100 and 102 in the input channels of the reset generator 52 prevent the continuous passage of such positive D.C. signal through the generator.

The reset generator comprises a network of diodes and resistors connected to the capacitors 100 and 102 in the manner illustrated in FIG. 4 to operate a relay 104. The network provides an output signal 106 in the form of a square shaped pulse or wave when a charge is imposed on either of the capacitors 100 or 102 by closing of the switch contacts 84A or 90D. The signal 106 is fed to the coil of the relay 104 to quickly make and break a switch 108 connected to the reset circuits 110 of the time measuring device, it being understood that the operation of the switch 108 by energizing of the relay 104 provides a reset of the time measuring device. It will thus be observed that the time measuring device 38 is reset each time one of the switch arms 84 or 90 moves out of the depression of the respective cam 80 or 86. Also, this resetting of the time measuring device occurs immediately after the antenna is first directed at either the red or green targets to start the counting by the time measuring device upon the transmission of the first transmitted signal after the respective resetting of the device.

The other switch contact 84B of the selector 44 is connected to the coil of a relay RY1, and the other contact 90C of the selector 46 is connected to the coil of a relay RY2. It will be observed that the coils of these relays are also connected to a common ground. The relays RY1 and RY2 form a portion of the range control device 40. As previously described in connection with FIG. 2, the range control device is provided with an adjustment to feed stop pulses to the time measuring device 38 only when the reflected signals are received from targets having substantially the same ranges as the desired targets. In the embodiment shown in FIG. 4, this adjusting means takes the form of a pair of manually adjustable potentiometers P1 and P2. The potentiometer P1 is associated with relay RY1 and the selector 44 and is adjusted to a predetermined setting depending upon the estimated range of the red target from the ship. The potentiometer P2 is associated with the relay RY2 and the selector 46 and is adjusted in accordance with the estimated range of the green target. It will also be noted that the potentiometers P1 and P2 are connected to a common ground through a resistor R111, as well as a source of negative D.C. energy 112 having a voltage of, for example, −105 volts. The negative D.C. source 112 is also connected to one of the contacts of each of the relays RY1 and RY2 and is utilized to control the D.C. bias on the control grid of a tube V16 which energizes gate control circuits in the range control device 40, as will be described, to control the range from which the reflected signals must come in order to send stop pulses to the time measuring device. Since the relays RY1 and RY2 operate in the same manner, a description of only one of the relays will be necessary.

When the switch arm 84 drops into the depression of the cam 80 to close the contact 84B, current from the source 98 is passed through the coil of relay RY1 to shift the switch arm of the relay and connect the D.C. bias 112 to the tube V16 through the potentiometer P1. It will then be apparent that the bias on the control grid of the tube V16 is increased toward zero, depending upon the setting of P1, which in turn controls the minimum range from which reflected signals will produce stop pulses in the range control device 40. This condition remains as long as the arm of the switch 84 remains in the depression of the respective cam 80. As soon as the switch 84 is moved to close the contact 84A and open the contact 84B, the energy supplied to the coil of the relay RY1 is discontinued and the relay shifts positions. The negative bias from the source 112 is then impressed directly on the control grid of the tube V16 to close the gate circuits, as will be described. It will thus be noted that the potentiometers P1 and P2 function in the same manner as the control knobs 42 previously described in connection with FIG. 2 to control the ranges from which the reflected signals will be utilized to send stop pulses to the time measuring device 38. It may also be noted that the relays RY1 and RY2 will remain in their energized states for several milliseconds due to their inertia; whereas the relay 104 in the reset generator 52 is a fast acting relay, such that the time measuring device 38 will be reset before stop pulses can be sent to the device by the action of the relays RY1 and RY2 to assure that the time measuring device will be reset when the range controls P1 and P2 are operating for their respective targets and provide an accurate time measurement of the travel time of a signal from the antenna to the respective desired target and back to the antenna.

As will be described in detail hereinafter, the range control device 40 is connected back to the cathode ray tube 60 and a bright arc is provided on the face of the tube corresponding to each of the range settings provided by the potentiometers P1 and P2 between the indications on the tube of the respective targets and the ship for monitoring the operation of the system. When adjusting the ranges provided by the potentiometers P1 and and P2, the respective relay RY1 or RY2 may be manually energized by the operator closing an auxiliary switch SW3 or SW4. For example, assuming that the range adjustment associated with the red target needs adjusting, the operator closes the switch SW3 to energize the coil of the relay RY1 to continuously hold in the potentiometer P1 and provide a continuous bright circle on the face of the cathode ray tube 60. While adjusting the potentiometer P1, this bright circle moves in or out, depending upon the adjustments, and the potentiometer is adjusted until the circle shown on the cathode ray tube is immediately inward of the point on the tube indicating the red target. When the switch SW3 is released and opened, the range control device 40 will function in a normal manner.

Figure 5A:
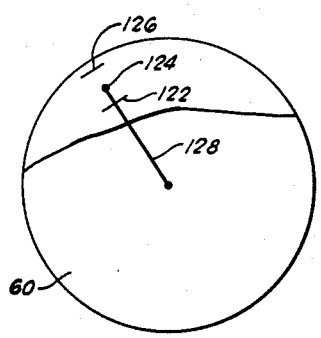
FIGURE 5A is a schematic illustration of the face of a cathode ray tube showing how the operation of the preferred system may be monitored.
Figure 6:
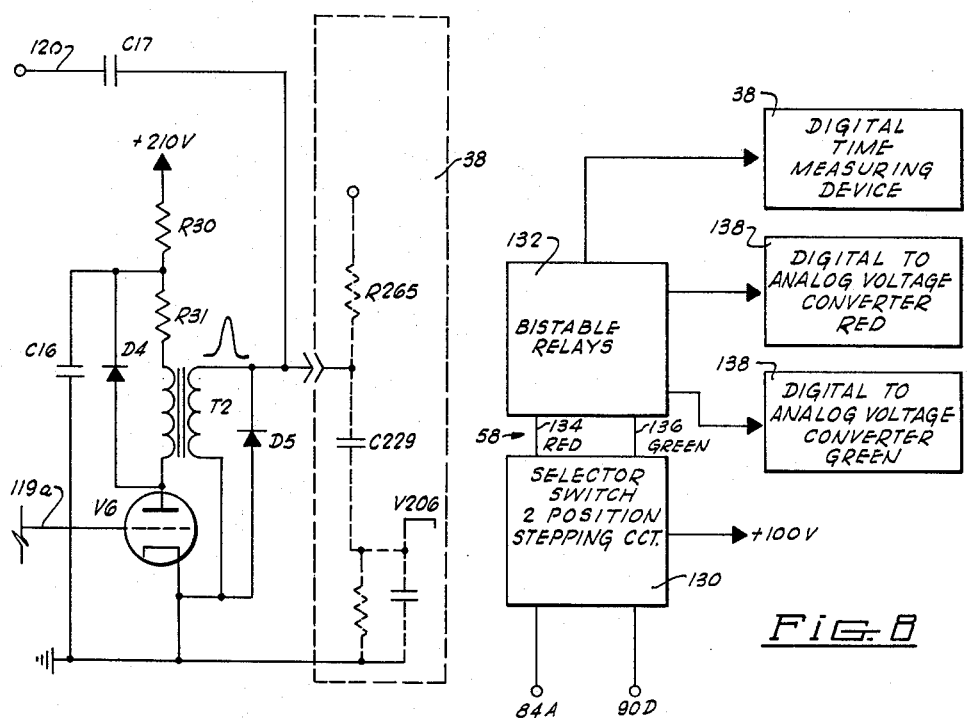
FIGURE 6 is a continuation from the right hand end of FIG. 5.

A wiring diagram for the range control device is illustrated in FIGS. 5 and 6, it being observed that FIG. 6 is a continuation from the right hand end of FIG. 5, and these two figures should be utilized together in this disclosure. It may also be noted in FIG. 5 that the relays RY1 and RY2, and the potentiometers P1 and P2, are again illustrated to complete the wiring diagram. As previously indicated, this device functions to scan the reflection information which is continually received by the receiver 36 to eliminate targets which give erroneous distance readings. The device 40 includes a monostable multivibrator 114 which is energized by start pulses through the conductor 92 from the transmitter 34 to provide a square wave output each time a start pulse is fed to the multivibrator. The square wave output of the multivibrator 114 is fed through capacitor C1 and resistor R1 to the control grid of a tube V1 against resistor R2 and condenser C2 which provides a negative going triangular wave form at the plate of tube V1. Tube V1 may be of any suitable type which will provide the desired wave form on the plate thereof and may be, for example, one half of a type 5963 tube. Resistor R4 is connected to the cathode of tube V1 to provide a wide dynamic range to this stage.

The negative going triangular wave form is fed through a capacitor C3 and resistor R5 to the first stage V2a of another tube V2. V2 is a Schmidt trigger with a narrow hysteresis range where switching occurs when the left hand grid dips below 10 volts. Resistors R5 and R6 comprise a voltage divider between a positive quiescent voltage at the junction of R3 and R5 and a negative, manually imposed, bias from tube V16. As previously noted in connection with FIG. 4, the biasing through the tube V16 is controlled by the adjustable potentiometers P1 and P2 to control the range of the desired reflected signals. At some repeatable time on the triangular wave, the Schmidt trigger will switch the second stage V2b of tube V2 into saturated conduction.

The plate load of V2b is a transformer T1 which will "ring" when high currents flow in the primary winding. Overshoot is suppressed by diode D1 so that only the first half cycle will appear at the output terminal (pin No. 4) of the transformer. We have used a transformer manufactured by the Hermatic Seal Transformer Co., Garland, Texas, part #955–0002–000. This transformer, in one embodiment of this invention, is specially chosen for its resonance frequency and produces a 50 volt pulse when a high current flows in the primary winding.

The pulse produced by the transformer T1 is fed to the suppressor or gating grid of a tube V5 (such as a type 6AS6 tube) through resistor R19 and is clamped to a negative power source, such as a —105 volt bus, by diode D3. Since the cathode of tube V5 (along with the other grids) is biased highly negative, the plate is grounded through resistor R20 and inductance L2, the plate load for tube V5. The resistors R21, R22, R23 and R24 and potentiometer P3 comprise the bias adjusting network, while condensers C12–C15 are stabilizing condensers for this network.

The reflected signals received by the receiver 36 are fed through the conductor 94 (which is in the form of a coaxial cable) to resistor R17, the determination resistor and cathode resistor of a grounded grid amplifier tube V4. Resistors R13 and R18 give negative bias to this stage. Capacitor C7 grounds the grid to signals. The reflected signals appear at the plate of tube V4 and are fed to the control grid of the gating tube V5 through a blocking capacitor C8. Resistors R15 and R16 and inductance L1 comprise the plate load for tube V4.

The tube V5 forms a gate for the reflected signals, and the gate is "on" when the suppressor grid is clamped to the —105 volt bus, such that signals can go through the gate stage and through the conductor 119 to the time measuring device. The wave form at the plate of tube V5 is a result of the gating signal from transformer T1 and the reflected signals from amplifier V4. The time measuring device 38 connected to the conductor 119 can be adjusted to be sensitive only to the reflected signals passing through gate V5. The reflected signals passing through the gate V5 function as stop pulses to stop the counting operation of the time measuring device.

In order to monitor the operation of the gating control, and monitor the range from which reflected signals are utilized in the range control device 40, the cathode resistor R10 in the V2b Schmidt trigger is coupled to the cathode of the first stage V3a of tube V3 (such as a type 5965 tube) through a diode D2. Tube stage V3a is a biased detector which amplifies the peak of the switching transient from the cathode of the Schmidt trigger. Resistor R27, potentiometer P4 and capacitor C9 comprise the biasing arrangement. Tube stage V3b is a cathode follower for power amplification of this transient and drives the intensity grid of the cathode ray tube 60 positive each time the signal gate comes on. This connection of the cathode follower V3b to the intensity grid of the cathode ray tube is indicated by the conductor 120 in both FIGS. 5 and FIG. 3. The resulting intensity modulation on the cathode ray tube provides a bright line or arc 122 on the face of the cathode ray tube as illustrated in FIG. 5A immediately inward of the spot 124 which indicates the position of the respective target. This bright line appearing on the face of the cathode ray tube informs the operator of the system that the gate is on at a certain range and will be on for a certain distance, such as 4000 feet. Also (see FIG. 6), a tube V6 and transformer T2 are provided to send a similar signal through the conductor 120 when the gate is closed to provide another bright line or arc 126 on the face of the cathode ray tube immediately beyond the bright spot 124 indicating the respective target. The grid of tube V6 is connected to the plate of the gating tube V5 through conductor 119a and quickly goes into conduction when the plate of tube V5 goes to zero volts, giving a transient in transformer T2 which, when shaped by diodes D4 and D5, leaves a small positive going spike for the intensity modulation. Resistor R31 is a plate load for tube V6 and capacitor C17 is a coupling capacitor to the cathode ray tube.

When the time measuring device 38 is in the form of a No. 526B time interval meter manufactured by Hewlett-Packard Company, the wave form at transformer T2 may also be used to stop the count of the meter if the expected target is not in existence. This connection of the transformer T2 to the meter is illustrated in FIG. 6 wherein the dashed lines indicate elements already existing in the meter and illustrated in Hewlett-Packard drawings of the meter. The object of this connection is to prevent the meter from making an erroneous count and fouling the operation of the system in the event no reflected signals are received from the expected target. It will be understood that this signal from the transformer T2 is fed to the time interval meter after the stop pulse should have been fed to the meter from the plate of the tube V5 through conductor 119, such that the transformer T2 cannot prevent the proper receipt of a stop pulse from the range control device 40 when the gate is on.

In reviewing the operation of the system to this point it will be observed that immediately after the antenna 30 is first directed at one of the desired red or green targets, the respective selector 44 or 46 energizes the reset generator 52 to reset the time measuring device 38. After each reset, the first start pulse received by the time measuring device 38 from the transmitter 34 starts the time measuring operation of the device 38. The device 38 measures time between the receipt of such a start pulse and the receipt of the first stop pulse from the range control device 40 to indicate the travel time of a signal from the antenna 30 to the desired target and back to the antenna 30. It will be recalled that the range control device 40 does not send a stop pulse to the time measuring device 38 until a reflected signal is received by the antenna 30 which has a travel time approximately equal to the expected travel time of a signal from the desired target, such that the time measuring device 38 will not be stopped by reason of any undesired target which may be reflecting signals back to the antenna 30 from a point between the antenna 30 and the desired target. When the time measuring device is in the form of a time interval meter of the preferred form, the time measurement provided by the device 38 is digital and is supplied in the form of a D.C. voltage for each digit which, as a group, are indicative of the particular time measurement.

Figure 7:
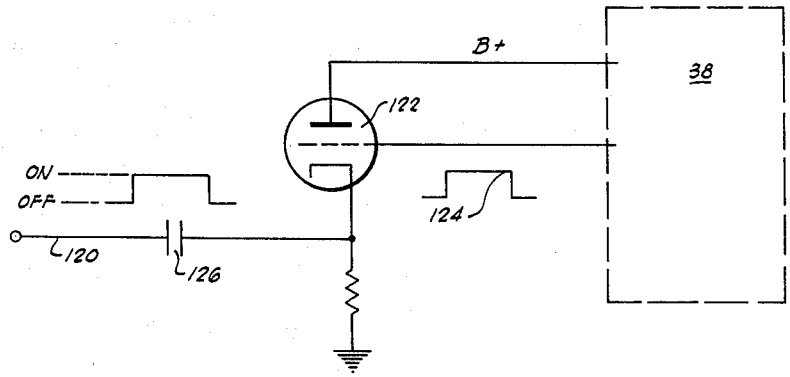
FIGURE 7 is a wiring diagram of a portion of the monitoring system.

To further assist in the manual control of the present system, and in monitoring the operation of the system, we provide (see FIG. 7) an amplifier 122 having its control grid connected to the time interval meter 38 in any suitable manner, such that the grid is supplied with a positive D.C. signal when the meter 38 is measuring time, as indicated by the wave form 124 in FIG. 7. The plate of the amplifier 122 is connected to a source of positive D.C. in the meter 38, such that the cathode of the amplifier will provide a power amplification of the signal 124. The cathode of the amplifier 122 is connected by the conductor 120 to the intensity control grid of the cathode ray tube 60 through a capacitor 126. As a result, a bright line 128 appears on the face of the cathode ray tube 60 extending from the center of the tube (which indicates the position of the ship) to the target toward which the antenna 30 is being directed while the meter 38 is counting. The length of this bright line 128 informs the operator whether or not the system is operating properly, since this bright line is indicative of the travel time of the reflected signal used to initiate a stop pulse to the meter 38; and if such reflected signal is reflected from the desired target, the bright line 128 will extend to this target. However, if the reflected signal is reflected from any other target, the bright line will extend to the target actually producing the bright line and the operator will then be advised that the system is not operating properly.

Figure 9:
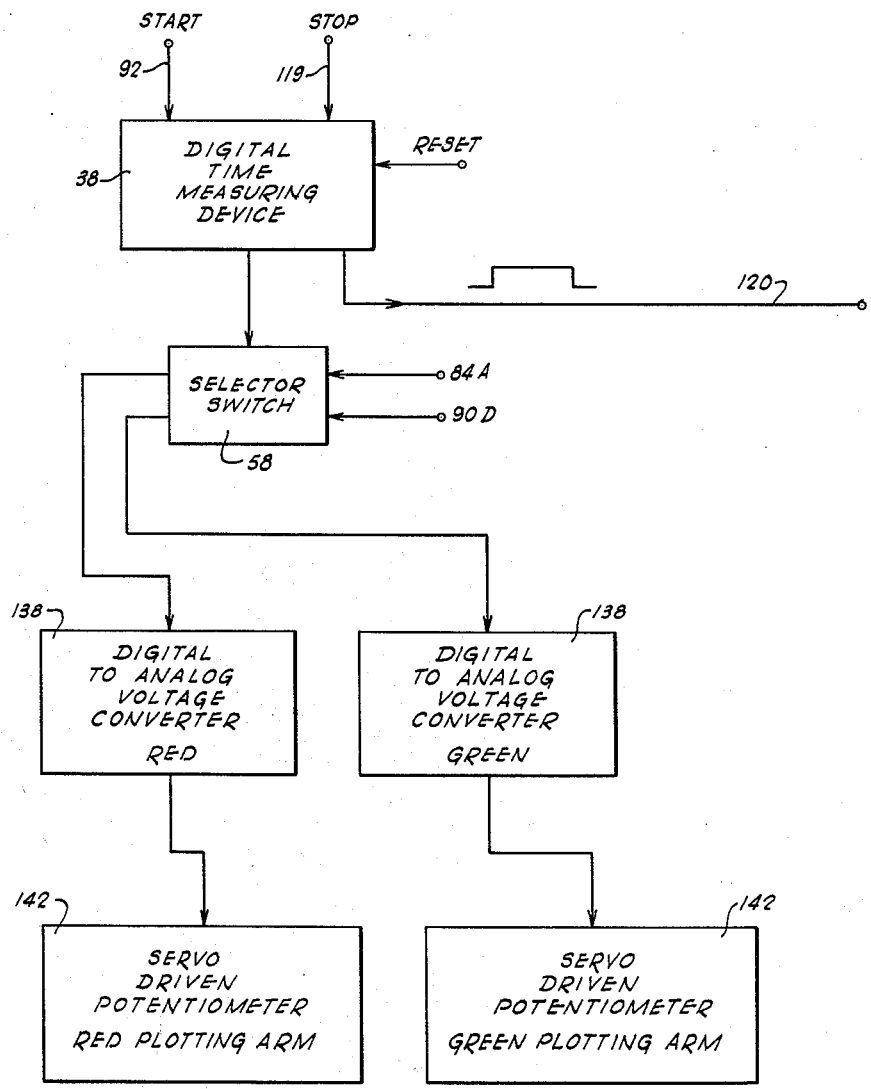
FIGURES 9 and 10 are illustrations of alternate embodiments for controlling the registration of the time measurements.

The two position selector switch 58 previously described in connection with FIG. 2 preferably comprises (see FIG. 8) a two position selector switch stepping circuit 130 of the holding or integrating type which is actuated by either pulses or steady state D.C., such as the type manufactured by G. H. Leland, Inc. of Dayton, Ohio, connected to a pair of suitable bistable relays 132 by a pair of conductors 134 and 136. The input to the stepping circuit 130 is from the contact 84A of the selector 44 and from the contact 90D of the selector 46. The stepping circuit 130 sends signals through the conductor 134 to the relays 132 when the antenna 30 is pointed directly at the red target, and the stepping circuit sends signals through the conductor 136 to the relays 132 when the antenna 30 is pointed directly at the green target. In one embodiment, the D.C. voltages produced by the time interval meter 38 (which is a digital representation of the time measurement) is also fed to the bistable relays 132, and the relays 132 operate to feed this signal to either one or the other of a pair of digital-to-analog voltage converters 138, depending upon whether the time measurement is being taken with respect to the red or the green target. This embodiment is also illustrated in FIG. 9 where it will be observed that the output of each of the converters 138 is fed to its respective servo-driven potentiometer 142 associated with a suitable registering device, as will be hereinafter described. Each of the converters 138 functions to convert the digital output of the time measuring device 38 to an analog voltage proportional to the respective time measurement and which may be used to drive a servo-driven potentiometer.

Figure 10:
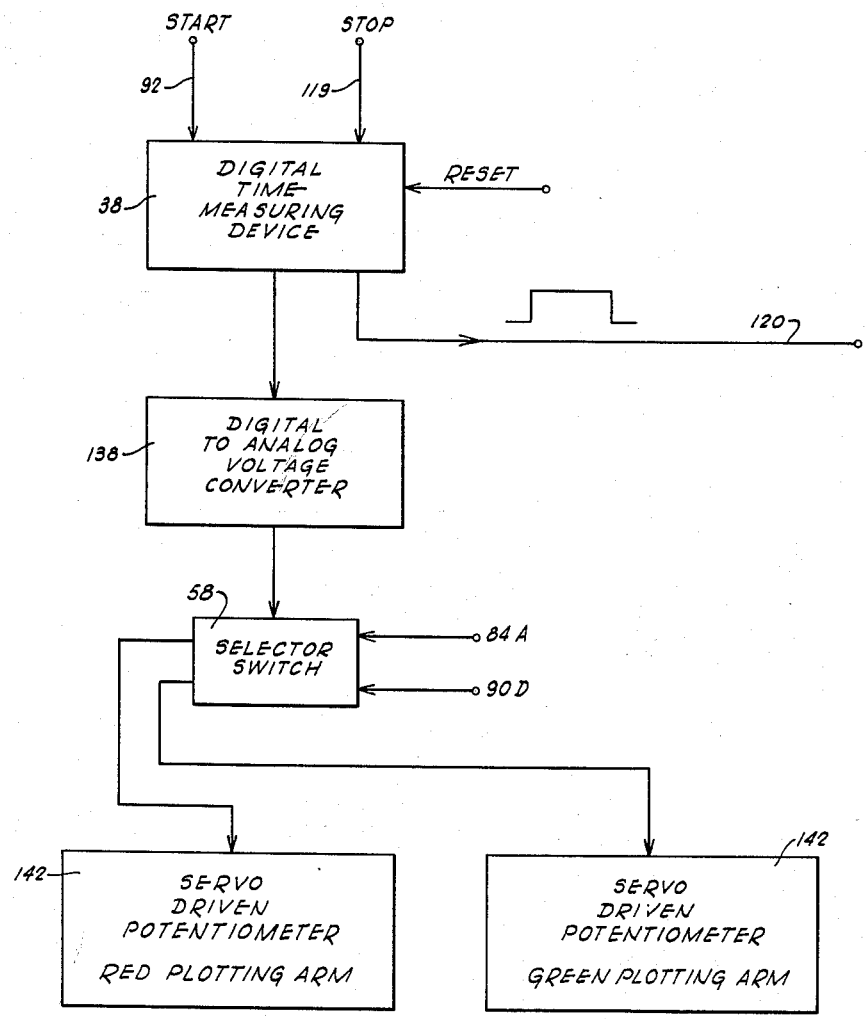

As an alternate embodiment, the signal representing a digital time measurement being supplied by the time interval meter 38 may be fed first to a digital-to-analog voltage converter 138 as illustrated in FIG. 10. In this embodiment, each digital time measurement is converted to an analog voltage by the respective converter 138, and then these analog voltages are selectively fed to the servo-driven potentiometers 142 through the selector switch 58. The embodiment illustrated in FIG. 9 is more versatile than the embodiment illustrated in FIG. 10 from an operating standpoint, but the embodiment illustrated in FIG. 10 is more economical and would therefore be more desirable in some installations of the present invention.

Figure 11:
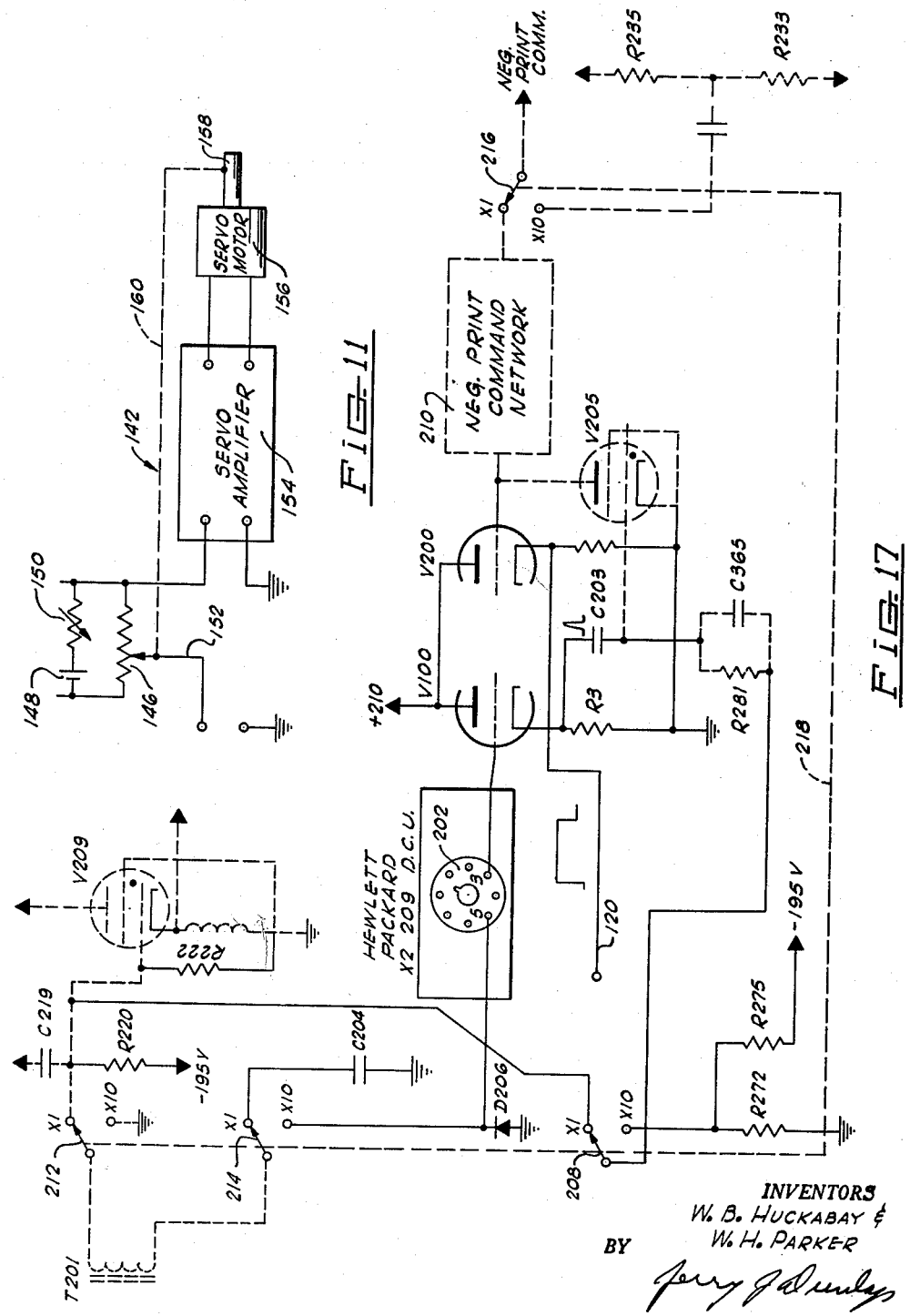
FIGURE 11 is a wiring diagram of a portion of the preferred registering means.

Each servo-driven potentiometer 142 is preferably constructed as illustrated schematically in FIG. 11, and comprises a suitable helical slide wire type potentiometer 146 having a reference voltage supplied by any suitable means 148, and having a calibrating resistor 150. The sliding contact 152 of the potentiometer 146 is connected either to a digital-to-analog voltage converter 138 (as illustrated in the embodiment of FIG. 9) or to the selector switch 58 (as illustrated in the embodiment of FIG. 10) to receive an analog voltage proportional to the distance of the antenna 30 from the desired target giving rise to the analog voltage. One end of the potentiometer 146 is connected to a suitable servo-amplifier 154 which in turn feeds amplified signals to a servo-motor 156. The output shaft 158 of the motor 156 is mechanically connected to the sliding contact 152 of the potentiometer 146, as indicated by the dashed line 160, to move the contact 152 when the shaft 158 is turned, which provides a feedback through the potentiometer 146 and tends to provide a zero voltage to the servo-amplifier 154. As a result, the motor shaft 158 is retained in a position provided by a particular analog voltage supplied to the sliding contact 152 until a subsequent and different signal is supplied to the sliding contact 152 from one of the converters 138 or the selector switch 58; whereupon, the output shaft 158 will be turned to a degree depending upon the difference between the successive voltages applied to the sliding contact 152. In other words, if subsequent voltages supplied to the sliding contact 152 vary, the shaft 158 will be turned in accordance with the difference between these two voltages. However, if subsequent voltages supplied to the contact 152 are equal, the motor shaft 158 remains in its previous position by action of the potentiometer 146 and the mechanical linkage 160. The motor shafts 158 may be connected to any desired registering means, but are preferably connected to a plotting device of the type illustrated in FIGS. 12 and 13.

Figure 12:
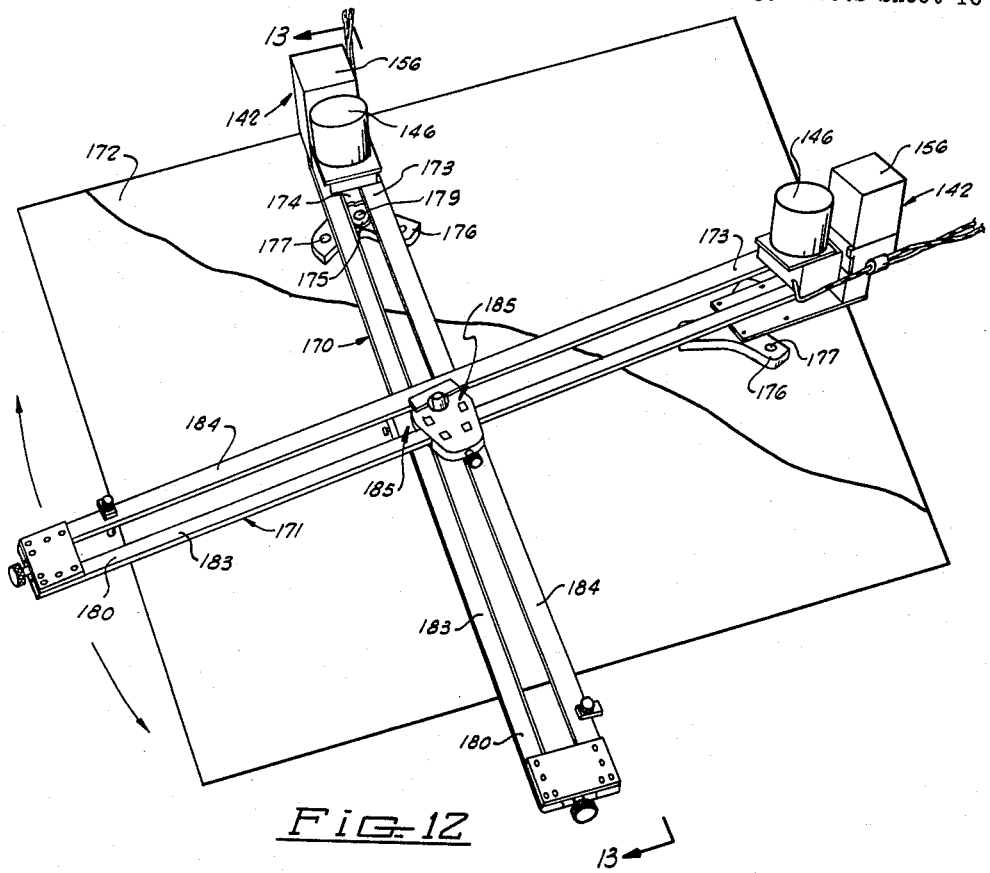
FIGURE 12 is a perspective view of the preferred plotter.

As shown in FIG. 12, the plotter comprises a pair of arms 170 and 171 arranged in crossing relation, one above the other, over a map 172 of the area being surveyed. One end 173 of each of the arms 170 and 171 is pivotally supported by a bracket 174 (see FIG. 13) and a bearing 175 on a triangular-shaped foot 176. Each foot has a supporting member 177 in the outer end of each leg thereof to rest on the map 172, and each of the members 177 is preferably formed out of a magnet to hold the respective foot in the desired position on the map when the map is mounted on a metal table 178 as is usually the case. Also, each foot 176 has an aperture 179 in the central portion thereof, as shown in FIG. 12, to enable the positioning of the respective foot over the desired point on the map 172. In this connection it should be noted that the precise positions of the red and green targets are marked on the map 172 and the feet 176 are accurately positioned with the apertures 179 centered over these positions, it being understood that one of the feet 176 is positioned over one target position and the other foot 176 over the other target position. It may also be noted that each bearing 175 is an annular type bearing and that the apertures 179 extend through these bearings, such that each of the arms 170 and 171 is pivotally supported over one of the red or green targets.

The opposite end 180 of each of the arms 170 and 171 is movably supported on the map 172 or table 178 by means of a ball 181 suitably held in the lower end of a leveling screw 182 threadedly connected to the respective arm. The screws 182 are adjusted to support the arms 170 and 171 horizontally over the table 178, with the arm 171 above the arm 170, as previously indicated. It will then be apparent that the arms can pivot in any desired direction with respect to one another and that the balls 181 will roll along the top of the map 172 with a minimum friction.

Each of the arms 170 and 171 comprises two bars 183 and 184 interconnected at their opposite ends and held in spaced parallel relation. The bar 183 of each arm has its opposite side edges beveled, as clearly shown in FIG. 13, to support a slide member generally designated by reference character 185. Each slide member 185 (see FIGS. 14 and 15) comprises upper and lower plates 186 suitably bolted together (not shown) and extending transversely above and below the bar 183 of the respective arm. Blocks 187 and 188 are positioned between the upper and lower plates 186 of each slide on opposite sides of the respective bar 183, and each block is provided with two sets of upper and lower rollers 189 arranged to engage the beveled edges of the bar 183 and movably support the slide 185 on the respective arm. The rollers 189 are supported at angles with respect to the bar 183, and by engaging the upper and lower beveled surfaces of the bar 183 they provide support for the respective slide 185 in all directions and yet permit movement of the slide along the bar with a minimum of friction. It will also be noted that the plates 186 are cut away to accommodate the rollers 189.

The block 188 of each slide 185 is rigidly secured between the respective upper and lower plates 186, for purposes to be described, but the blocks 187 are only slidingly disposed between the respective plates 186 for adjusting the load applied on the rollers 189. An internally threaded member 190 is rigidly secured between the plates 186 at the ends thereof opposite the block 188 to receive an adjusting screw or bolt 191. The inner end of the bolt 191 bears against a pressure plate 192 slidingly disposed between the plates 186, which in turn compresses an elastic member 193 against the block 187 and urges the block 187 toward the bar 183. Thus, all of the rollers 189 are held in contact with the bar 183 with the desired force to support the respective slide 185.

An aperture 194 is provided through each of the plates 186 and the block member 188 to rotatably receive a tubular connector 195 (see FIG. 13) for interconnecting the slides 185. The central portion of the connector 195 may be of increased diameter for positioning between the slides 185 to easily and simply pivotally interconnect the slides, such that movement of either slide will provide a similar movement of the other slide. The connector 195 may be utilized to carry a pen or the like 195a which provides a plot on the map 172 of the movement of a ship or the like on which the plotter is used, as will be more fully described.

Figure 13:
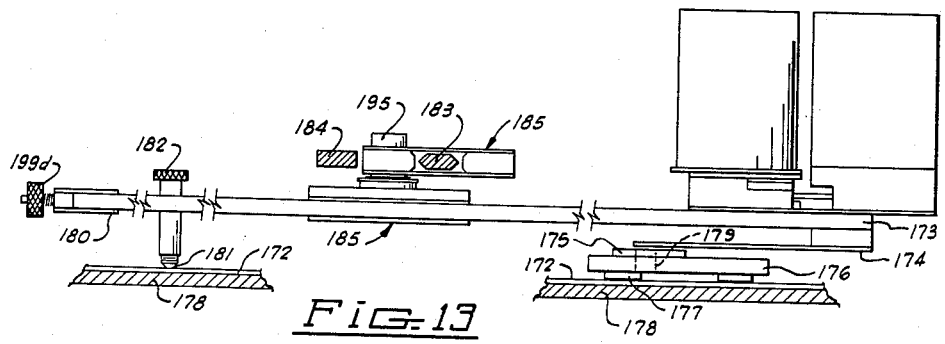
FIGURE 13 is a sectional view as taken along lines 13—13 of FIG. 12.
Figure 16:
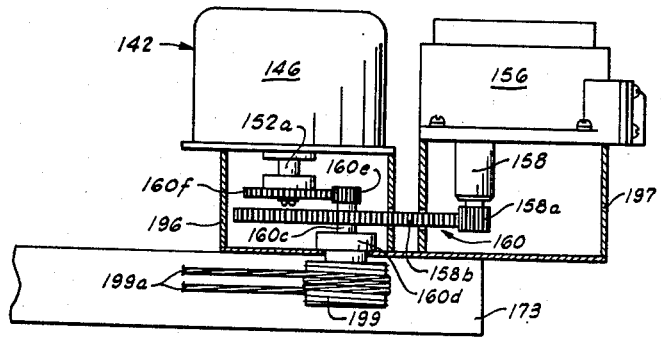
FIGURE 16 is an enlarged side elevational view of a typical drive system for one of the plotter arms.

As shown in FIGS. 13 and 16, the potentiometer 146 and servo-motor 156 of each servo-driven potentiometer 142 previously shown in FIG. 11 is mounted on the end 173 of one of the plotter arms 170 or 171, it being understood that one of the servo-driven potentiometers 142 is associated with each plotter arm. Each potentiometer 146 is supported on the respective plotter arm by a housing 196 and each motor 156 is supported by a housing 197. In this embodiment, the mechanical linkage 160 connecting the motor shaft 158 to the sliding contact 152 of the potentiometer 146 is in the form of a gear 158a on the motor shaft engaging a larger gear 158b mounted on an auxiliary shaft 160c supported by a bearing 160d below the potentiometer 146, along with a small gear 160e meshing with a gear 160f mounted on the sliding contact supporting shaft 152a to provide the feed-back previously described. It will also be noted that the various gears of the linkage 160 are supported in the housings 196 and 197.

Figure 13A:
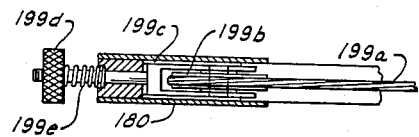
FIGURE 13A is a sectional view through one end of a typical plotter arm.
Figure 14:
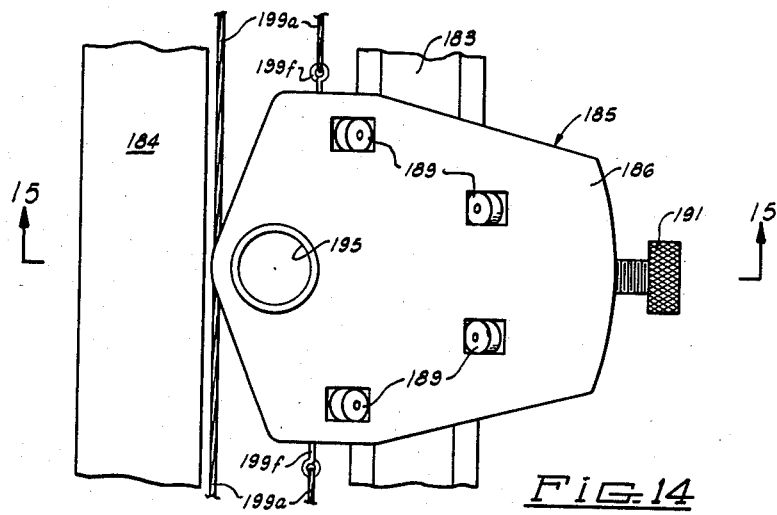
FIGURE 14 is a plan view of the slide on one of the arms of the plotter.
Figure 15:
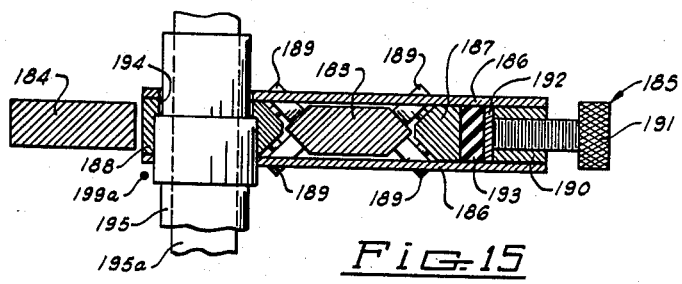
FIGURE 15 is a sectional view as taken along lines 15—15 of FIG. 14.

An externally grooved drum 199 is rigidly mounted on the lower end of the auxiliary shaft 160c between the bars 183 and 184 of the respective plotting arm 170 or 171 to receive wire 199a which is extended along the respective arm between the bars 183 and 184 to the opposite end 180 of the arm. As shown in FIG. 13A, the wire 199a is extended around an idler pulley 199b mounted in the end 180 of the respective arm to facilitate the lengthwise movement of the wire when the drum 199 is turned by the motor 156. It may also be noted that the idler pulley 199b is supported by a clevis 199c secured in the respective end of the arm by a nut 199d and helical spring 199e between the nut 199d and the end of the arm to provide an easy means for adjusting the tension on the wire 199a.

As previously indicated, each wire 199a is extended along the respective plotting arm between the bars 183 and 184. That portion of the wire 199a at one side of each plotting arm (see FIG. 14) is secured to the respective slide 185 by connectors 199f, such that the slides are moved along the arms upon turning of the respective motor shafts 158.

The operation of the plotter shown in FIGS. 13–16 is believed apparent from the foregoing description. To summarize, however, it was previously explained in connection with FIG. 11 that the motor shaft 158 of each servo-driven potentiometer is turned when differing sequential voltages (representing distances from the targets) are fed to the respective potentiometer, and that the shaft 158 is turned in accordance with the voltage change. Therefore, the angular position of each motor shaft 158 is indicative of the distance to the associated red or green target. When using the present plotter, the slides 185 are moved along the arms 170 and 171 in accordance with the settings of the respective motor shafts 158. Since each arm of the plotter is pivotally supported at a point corresponding to one of the target positions, the connector 195 journaled between the slides 185 will always denote the position of the antenna used in the positioning system, and hence the position of the ship in a marine surveying operation. For example, if the arm 170 is associated with the red target and the distance between the ship and the red target decreases appreciably while the distance between the ship and the green target stays substantially constant, the side 185 associated with the arm 170 will be moved by the respective motor 156 toward the end 173 thereof. The slide 185 on the arm 171 will also therefore move in the same direction by virtue of the connector 195. However, the slide 185 associated with the green target will stay in a substantially fixed position on the respective arm 171, such that the arm 171 will be pivoted toward the end 173 of the arm 170 and the connector 195 will follow the movement of the ship as represented on the map 172. A pen 195a supported in the connector 195 would therefore plot (on the map 172) the course traveled by the ship, and such plot will be accurate to within a very few feet when the remainder of the preferred positioning determining system is used. However, the prescribed course for the ship may be plotted on the map 172 before a surveying operation. In this latter event the operator of the system may observe whether or not the ship is following the prescribed course by viewing through the hollow connector 195.

In the embodiment previously described the time measuring device 38 provides a digital measurement of the travel time of a single signal from the antenna 30 to the desired target and back to the antenna 30, which will in turn indicate the distance of the antenna 30 from the respective target. Such a system provides substantially more precise distance measurements than existing position determining systems and will have great utility in many operations. However, we also contemplate the averaging of a plurality of travel times each time the antenna is directed at one of the desired targets to provide substantially increased precision in the time measurement. As is well known, an averaging operation involves both a summing operation and a dividing operation. In the present system the summing operation is performed in the time measuring device 38 and the dividing operation is performed in the converter or converters 138. In order to provide the average of a plurality of travel times, we add voltage dividing networks to the converter 138 and modify a time interval meter of the type 524B produced by the Hewlett-Packard Company in the manner illustrated in FIG. 17. In FIG. 17 the dashed lines are taken from drawings of a Hewlett-Packard 524B counter and it is not believed necessary to describe these portions of the counter in detail. The solid lines shown in FIG. 17 illustrate elements added to an existing 524B counter to provide the summing operation.

Basically, the modification shown in FIG. 17 involves the addition of a Hewlett-Packard type XZ209 decade counting unit 202, and a combination tube comprising a cathode follower V100 and an amplifier V200, such as a type 5965 tube, to an existing 524B counter. The addition of the decade counting unit 202 and other circuitry changes the characteristics of the meter such that it is then responsive to ten sequential start and stop pulses before holding a total count, rather than being responsive to a single start pulse and a single stop pulse as previously described.

The blocking oscillator transformer T201 in the existing time interval meter produces a pulse each time the meter is energized for a counting operation. This signal is inverted and fed to pin No. 5 of the decade counting unit 202 which operates the display time thyratron V205 of the existing meter through the cathode follower V100 on the tenth start pulse received by the meter. Condenser C203 is the coupling capacitor and diode D206 is an over-shoot limiter at the input of the decade counting unit 202. Tube V200 receives the gate condition information and drives the intensity control element in the cathode ray tube 60 through conductor 120 in the manner previously described to indicate to the operator of a system that the meter is counting. The output of the meter 38 may be fed to a printing command network 210 which is normally supplied with the meter for providing a printed record of the distance measurement, as well as being fed to the switch 58 or the converter 138 as previously described. It may also be noted that when a single decade counting unit 202 is provided, the meter 38 will provide a sum of the travel times of ten signals reflected by the desired target. If the average of a larger number of travel times is desired, an additional decade counting unit 202 may be connected in series, and each additional decade counting unit 202 added results in a multiplication of the number of travel times averaged by ten. In other words, when two of the decade counting units 202 are connected in series, the meter will provide a sum of 100 travel times.

When the travel time of a single signal is desired, the various switches 208, 212, 214 and 216 are moved by a linkage indicated by the dashed line 218 to the X1 positions. With the modifications provided by the present system, resistors R220 and R222 are added as biasing resistors for an existing tube V209 in the meter to produce the same bias that the resistors R272 and R275 provide in the multiple count operation. Also, condenser C204 provides an A.C. bypass for the single count operation.

Figure 18:
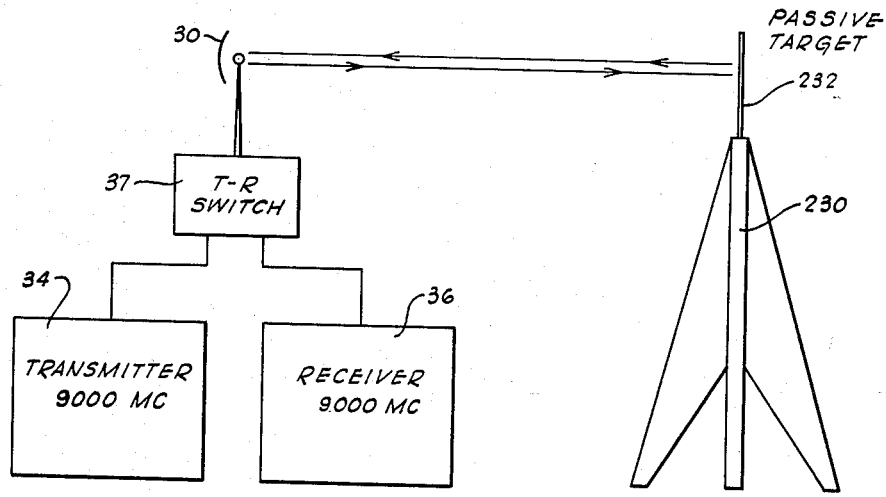
FIGURE 18 is a schematic illustration of one form of transmitting and reflecting system which may be used in the present invention.

In the embodiment described it has been assumed that the desired red and green targets were passive type targets which merely function to reflect signals transmitted by the antenna 30, with the targets preferably being shaped to reflect signals polarized in a given direction to assist in the distinguishing of the reflected signals from the desired and undesired targets. This type of operation is illustrated in FIG. 18 where both the transmitter 34 and the receiver 36 are adjusted to the same frequency. For example, the transmitter 34 may be set to feed signals of a frequency of 9000 mc. through the TR switch 37 to the antenna 30. In this event, the signals reflected by the targets to the antenna 30 will also have a frequency of 9000 mc. and these reflected signals are fed through the TR switch 37 to the receiver 36. It will then be apparent that the receiver 36 would also be set to receive only 9000 mc. signals, such that any noise which would be received by the antenna 30 would not provide an erroneous reading.

Figure 19:
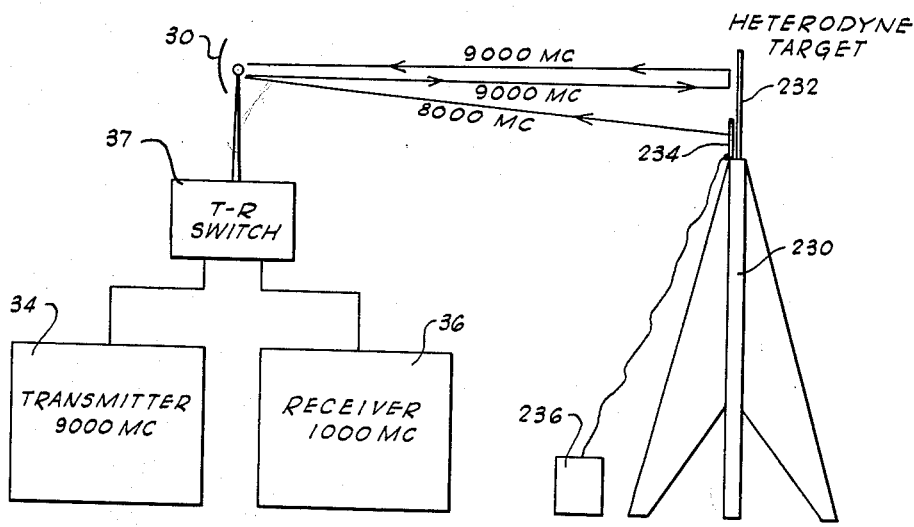
FIGURE 19 is a schematic illustration of an alternate transmitting and reflecting system of the heterodyne type.

In some areas, such as in localities where a large number of good reflecting, but undesired, targets are provided along the shore line of the area to be surveyed, it is desirable to use a heterodyne type of system as illustrated in FIG. 19. In this type of system, we provide a target 230 having a good reflecting surface 232 for reflecting signals transmitted from the antenna 30, along with an antenna 234 which will transmit a signal provided by a signal source 236. The signal source 236 may produce either a continuous wave or random pulses having a specific frequency for transmission by the antenna 234. When using the heterodyne target 230, the transmitter 34 is set at a specific frequency and the receiver 36 is set to receive only those signals having a frequency which is either the sum of or the difference between the frequencies provided by the transmitters 34 and 234. For example, the transmitter 34 may be set to transmit signals of 9000 mc. and the transmitter 236 may be set to transmit signals of 8000 mc. The receiver 36 would then be set to receive only those signals having a frequency of 1000 mc. Therefore, only when the antenna 30 is receiving both 8000 mc. and 9000 mc. signals will the receiver function to generate stop pulses for the present system, such that no undesired targets can reflect the required frequency to the antenna 30 and provide an erroneous reading.

Figure 20:
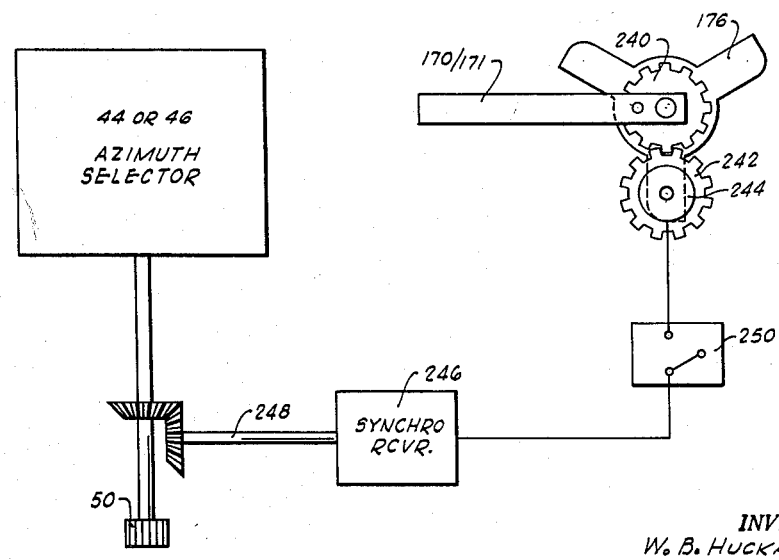
FIGURE 20 is a schematic illustration of means for automatically adjusting the azimuth selectors.

The present invention also contemplates an automatic adjustment of the azimuth selectors 44 and 46, rather than manual adjustments as previously described. As shown schematically in FIG. 20, a gear 240 may be rigidly secured to each of the plotting arms 170 and 171 for a turning movement corresponding to changes in direction of the respective plotting arms. It will be apparent that each plotting arm extends at an angle from the respective target position indicative of the azimuth of the target with respect to the ship, and that when the respective plotting arm is turned in response to movement of the ship, the plotting arm follows the changes in azimuth. Therefore, the angular position of each gear 240 also indicates the azimuth of the respective target with respect to the ship, and any turning movement of the gear 240 is indicative of a change in such azimuth.

Each gear 240 meshes with a mating gear 242 suitably journaled on the respective foot 176 and the input shaft of a suitable synchro-transmitter 244 is rigidly secured to gear 242. It will be understood that the synchro-transmitter 244 is supported on the plotter in any suitable manner, such that the transmitter 244 will generate a signal proportional to any change in position of the respective plotting arm 170 or 171. The signals produced by each transmitter 244 are fed to a suitable synchro-receiver 246 having its output shaft 248 geared to shaft of the adjusting knob 50 of the respective azimuth selector 44 or 46. It should also be noted that a switch 250 is interposed in the connection of the transmitter 244 to the receiver 246 to permit the disconnection of the receiver 246 and knob 50 from the plotting device when the knob 50 is originally set and while the plotter is being placed in operation. When the switches 250 are closed, each selector 44 and 46 is automatically adjusted as the respective plotting arm is turned in response to movement of the ship, whereby the reflected signals giving rise to stop pulses will be received only from those sections of the azimuth in which the desired targets are located, as previously described.

In the embodiment shown in FIGS. 3 through 16 and previously described herein, the reset generator 52 is energized by the cams 80 or 86 (FIG. 4) when the antenna 30 is pointed directly at either of the red or green targets. As a result, the time measuring device 38 will also be operative only when the antenna is pointed directly at either of the desired targets. Since the speed of rotation of the antenna is slow compared with the travel times of the signals from the antenna to either target and back to the antenna, the section of the azimuth associated with the target from which reflected signals are received (the sections between the lines 22 and 24 or between lines 22a and 24a in FIG. 1) is, as a practical matter, limited to substantially the width of the antenna beam. However, we have found it very desirable, in some installations, to use an antenna having what may be considered a very narrow beam, such as ¾°, and, in that event, it is also desirable to be able to utilize signals which may be reflected to the antenna from a section of the azimuth associated with each target which is substantially wider than the antenna beam to reduce the required precision in the setting of the azimuth selectors. In other words, it is sometimes desirable to scan a section of the azimuth in the vicinity of each desired target wider than the beam. This modification is schematically illustrated in FIG. 21.

Figure 21:
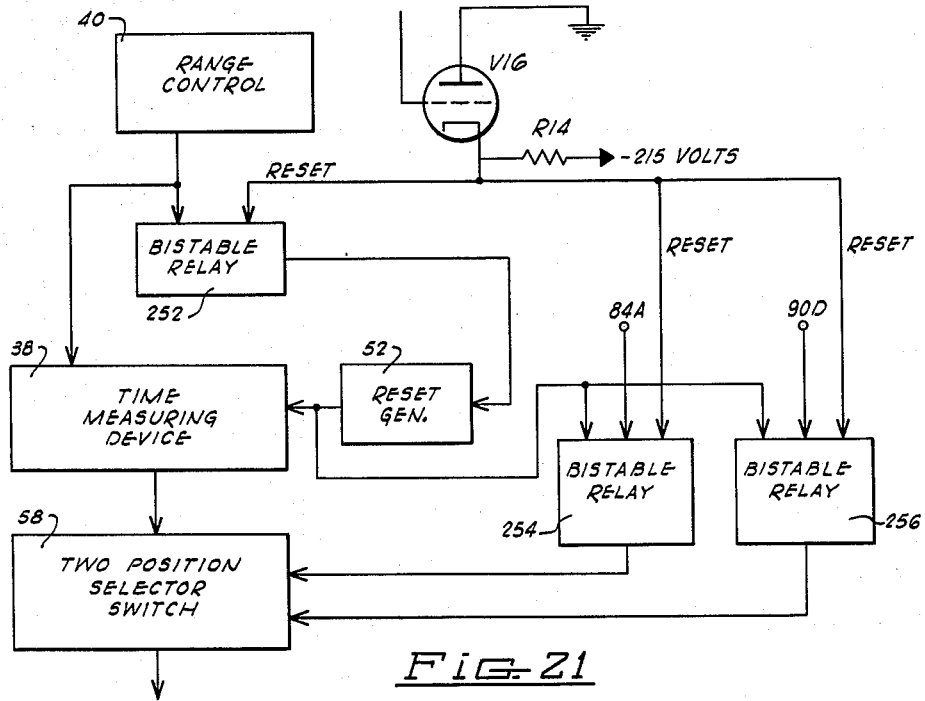
FIGURE 21 is a schematic illustration of still another embodiment of this invention.

In the modification shown in FIG. 21, the reset generator 52 is energized by action of the range control device 40, rather than the azimuth selectors as previously described. Stop pulses from the range control device 40 are fed to a bistable relay 252 which in turn feeds a pulse to the reset generator for resetting the time measuring device 38 when the first stop pulse of a series is produced by the range control device 40. The bistable relay 252 functions to send a pulse to the reset generator 52 in response to the first stop pulse of a series produced by the range control device 40 after being reset, but is insensitive to subsequent stop pulses until it is again reset. The bistable relay 252 is reset each time the cathode of tube V16 in the range control device goes to −105 volts which, as previously described, is some time after the antenna is pointed directly at the respective target. As a result, the time measuring device 38 is not sensitive to start pulses and does not start counting until reflected signals are being received by the range control device which have the proper travel time as controlled by the gating circuit previously described, and the sections of the azimuth on opposite sides of the expected target position are scanned to assure that the target, if existing, will give rise to reflected signals for the time measuring operation.

The reset generator 52 is also utilized to actuate a pair of bistable relays 254 and 256 interposed in the connections of the selector switch contacts 84A and 90D to the two position selector switch 58 previously described. The bistable relays 254 and 256 function to prevent the time measuring device 38 from sending a signal to the wrong registering means in the event one of the expected targets does not cause a reflection of signals to the antenna. More specifically, the reset generator 52 actuates the bistable relays 254 and 256 each time the time measuring device is reset, such that, for example, the signal from the switch contact 84A will pass to the selector switch 58 when the antenna is directed toward the red target only if the time measuring device 38 has been reset and is measuring time which should be sent to the registering means for the red target. However, assuming that the red target did not give rise to reflected signals as expected, the reset generator does not actuate the bistable relays 254 and 256, such that no signal will be passed to the selector switch 58 to foul its subsequent operation, and the selector switch 58 will then be in the proper position and will continue to direct the time measurement signal to the green target registering means. The bistable relays 254 and 256 will be reset by the cathode of tube V16 simultaneously with resetting of bistable relay 252.

From the foregoing it will be apparent that the present invention provides a system for precisely determining the position of a station which may be located either on land, on water or in the air, and is particularly useful aboard a ship, such that the efficiency and accuracy of marine seismic surveys may be appreciably improved. The present system utilizes two known targets spaced at various directions and distances from the station and provides precise distance measurements of the station from each target, such that the precise position of the station may be determined. All signals reflected to the station caused by unknown or undesired targets are, in effect, ignored and cannot be used to provide erroneous readings by the positioning system. An appreciable portion of existing navigation equipment on a ship may be utilized to provide an economical system. It will also be apparent that the present invention provides a novel system and method for averaging a plurality of travel times to provide a precise time measurement, and that the present invention provides a novel and simply constructed plotter mechanism for continuously plotting the position of a mobile station on a map. Finally, it will be apparent that the present invention is simple in construction, may be economically manufactured, and may be easily and economically operated.

Changes may be made in the combination and arrangement of parts or elements, as well as in the combination and arrangement of steps or procedures, as heretofore set forth in the specification and shown in the drawings, it being understood that changes may be made in the embodiments disclosed herein without departing from the spirit and scope of the invention as defined in the following claims.

We claim:
1. A system for determining with precision the position of a station with respect to a pair of spaced targets, the combination of:
   (a) means including a display for determining the approximate range and direction of the targets from the station,
   (b) means for transmitting a series of pulse type signals from the station towards one of the targets and, alternately, toward the other target,
   (c) means for receiving those signals reflected to the station,
   (d) time measuring means capable of metering a time interval and holding the total count,
   (e) means for starting the time measuring means simultaneous with the transmission of one of said signals of each series from the station,
   (f) adjustable means for stopping the time measuring means only upon the receipt at the station of a reflected signal of the respective series of signals which arrives at the station at a time spaced from the respective starting of the time measuring means corresponding to approximately twice the expected travel time of a signal between the station and the respective target, said adjustable means being connected to said display to indicate on said display the range, for each target, from which reflected signals are effective in stopping the time measuring means as set by said adjustable means, and
   (g) means for registering the time measurements of the time measuring means from which the precise position of the station with respect to the targets may be determined.

2. A system as defined in claim 1 wherein said means for alternately transmitting a series of pulse type signals from the station towards each of the targets and said means for receiving those signals reflected to the station comprises a radar transmitter, antenna and receiver.

3. A system as defined in claim 2 wherein said time measuring means is an electronic time interval meter, and wherein said means for starting the time measuring means comprises a conductor interconnecting said transmitter to the time interval meter for sending a starting signal to the time interval meter each time a signal to be transmitted is sent to the antenna.

4. A system as defined in claim 3 wherein said means for stopping the time measuring means comprises a gating circuit connected to the radar receiver and transmitter for sending a reflected signal to the stop input of the time interval meter when the reflected signal is received by the receiver at a time spaced from the time of transmission of a signal from the transmitter corresponding to approximately twice the expected travel time of a signal between the antenna and the target toward which the antenna is directed.

5. A system as defined in claim 1 wherein said time measuring means comprises a digital type electronic time interval meter having a D.C. voltage output representing the digital time measurement of said meter, and wherein said registering means comprises a digital-to-analog converter connected to the output of the time interval meter for producing an analog voltage proportional to the digital time measurement of the time interval meter, a servo-driven potentiometer for each of the targets, and a selector switch connecting said converter to said potentiometers, said selector switch being connected to said transmitting means for switching the output of said converter between said potentiometers in accordance with which target the signals are being transmitted toward.

6. A system as defined in claim 1 wherein said time measuring means comprises a digital type electronic time interval meter having a D.C. voltage output representing the digital time measurement of said meter, and wherein said registering means comprises a pair of digital-to-analog converters for producing an analog voltage proportional to the time measurement represented by a D.C. voltage fed thereto, a selector switch connected to the output of said meter and to said converters for switching the output of said meter between said converters in accordance with the target toward which signals are being transmitted, and a servo-driven potentiometer connected to each of said converters.

7. A system as defined in claim 1 wherein said time measuring means comprises a digital type electronic time interval meter having a D.C. voltage output representing the digital time measurement of said meter; and wherein said registering means comprises a map having the positions of the targets plotted thereon, a pair of plotting arms supported in crossing relation above the map, one end of each of said arms being pivotally supported directly above the position of one of the targets, a slide mounted on each arm for movement lengthwise along the respective arm, drive means for moving each slide along the respective arm in accordance with the output of said meter associated with the respective target to position the respective slide from the pivotal point of the respective arm a distance proportional to the distance of the respective target from the station, and a connector journaled to both of side slides for maintaining the slides in a fixed relation, whereby the position of said connector indicates the position of the station with respect to the targets.

8. A system for determining with precision the position of a mobile station with respect to a pair of spaced targets, the combination of:
 (a) a rotory type directional antenna mounted at the station,
 (b) drive means for turning the antenna in a circuit in a position to alternately scan the targets;
 (c) pulse type signal transmitting means,
 (d) signal receiving means,
 (e) a TR switch connecting the transmitting means and receiving means to the antenna for transmitting a pulse type signal from the antenna and, alternately, receiving signals reflected back to the antenna,
 (f) electronic time measuring means responsive to start and stop pulses for measuring the time therebetween and holding the total count until reset,
 (g) means for sending a start pulse to the time measuring means each time a signal is transmitted from said transmitting means through the antenna,
 (h) control means connected to said receiving means, transmitting means, drive means and time measuring means responsive to said reflected signals for sending a stop pulse to the time measuring means only when a reflected signal is received while the antenna is directed toward one of the said spaced targets and only when said reflected signal has a travel time substantially corresponding to the expected travel time of a signal reflected by the respective target, and responsive to said drive means for resetting the time measuring means each time the antenna is directed toward either of the targets, and
 (i) means for registering the time measurements of the time measuring means, from which the distance of the station from the targets may be determined.

9. A system for determining the position of a mobile station with respect to a pair of spaced targets, the combination of:
 (a) a rotary type directional antenna mounted at the station,
 (b) drive means for turning the antenna is a circle in a position to alternately scan the targets;
 (c) pulse type signal transmitting means,
 (d) signal receiving means,
 (e) a TR switch connecting the transmitting means and receiving means to the antenna for transmitting a pulse type signal from the antenna and, alternately, receiving signals reflected back to the antenna,
 (f) electronic time measuring means responsive to start and stop pulses for measuring the time therebetween and having a reset circuit, said time measuring means being characterized by being capable of holding a total count after receiving a stop pulse and not being responsive to subsequent start and stop pulses until reset,
 (g) means for sending a start pulse to the time measuring means each time a signal is transmitted from said transmitting means through the antenna,
 (h) an adjustable range control means connected to said transmitting and receiving means and to the time measuring means and responsive to said start pulses and reflected signals for sending a stop pulse to the time measuring means each time a reflected signal is received at a time interval after the occurrence of a start pulse which is substantially equal to the expected travel time of a signal reflected by either of the targets,
 (i) selector means connected to said drive means for enabling the range control means only when the antenna is directed toward one of said targets,
 (j) a reset generator connected to said selector means and the reset circuit of the time measuring means for resetting the time measuring means each time the antenna is directed at either of the targets, and
 (k) means for registering said time measurements, from which the distance of the station from the targets may be determined.

10. A system as defined in claim 9 wherein said range control means includes a gating circuit for the reflected signals, two adjustable range control elements connected to the gating circuit for alternately opening the gating circuit and passing the reflected signals to the time measuring means as stop pulses, and means connecting said range control elements to said selector means for opening the gating circuit when the antenna is directed toward either of the targets.

11. A system as defined in claim 10 wherein said selector means comprises a cam associated with each of the targets and having a depression therein, means for rotating said cams simultaneous with the rotation of the antenna, a switch associated with each cam and operable by movement into the respective depression, said cams being supported with their depressions in spaced circumferential relation in accordance with the azimuths of the targets with respect to the antenna to operate said switches when the antenna is directed toward the respective targets, and means connecting each of said switches to one of said range control elements.

12. A system as defined in claim 11 wherein each of said range control elements includes an adjustable potentiometer to control the opening time of the gating circuit in accordance with changes in position of the station.

13. A system as defined in claim 12 wherein said means connecting each of said switches to one of said range control elements comprises a relay having its switch arm associated with the movable contact of the respective potentiometer, each of said relays having a time delay therein greater than the time delay in the reset generator to close the gating circuit after the time measuring means is reset.

14. A system as defined in claim 9 wherein said time measuring means is an electronic time interval meter, and characterized further to include a counting unit connected to said meter for summing a plurality of travel times of said transmitted and reflected signals each time the antenna is directed toward one of the targets.

15. In a system for accurately determining the position of a mobile station with respect to a pair of spaced first and second targets, the combination of:
   (a) a combination transmitting and receiving radar antenna at the station,
   (b) drive means for turning the antenna through an arc of 360 degrees to alternately scan the targets,
   (c) a transmitter for sending time spaced pulse type signals through the antenna,
   (d) a receiver for receiving signals reflected back to the antenna,
   (e) a TR switch connecting the transmitter and receiver to the antenna for alternately transmitting signals from the antenna and feeding signals received by the antenna to the receiver,
   (f) a radar indicator having a cathode ray tube therein and connected to the receiver and drive means for displaying the approximate positions of the targets with respect to the station,
   (g) a time interval meter for measuring the time between reception of a pair of time spaced signals fed thereto,
   (h) control means connecting the transmitter, receiver and drive means to the time interval meter for feeding signals to said meter while the antenna is scanning each of the targets corresponding, in time, to each transmitted signal and the respective reflected signal received by the antenna having a time of occurrence approximately equal to the expected travel time of a signal to and from the respective target as indicated by the radar indicator, and
   (i) means for separately summing and dividing the time intervals measured by said meter with respect to each of the targets to obtain an average time interval, from which averages the precise distance of the station from the targets each time the antenna scans the targets may be obtained.

16. A system for determining the position of a station, the combination of:
   (a) a pair of combination target and transmitting means located in spaced and known relation, each of said means having a reflecting surface and a transmitter for transmitting a signal of a first frequency,
   (b) means at the station for transmitting a series of pulse type signals of a second frequency toward one of said combination target and transmitting means and then, alternately, toward the other combination target and transmitting means,
   (c) means for receiving signals at the station having a frequency which is a beat frequency of said first and second frequencies,
   (d) time measuring means,
   (e) means for starting the time measuring means simultaneous with the transmission of one of said signals of each series from the station,
   (f) means for stopping the time measuring means upon receipt by said receiving means of a beat frequency signal which arrives at the station at a time spaced from the respective starting of the time measuring means corresponding to approximately twice the expected travel time of a signal between the station and the respective combination target and transmitting means, and
   (g) means for registering the time measurements of the time measuring means, from which the precise position of the station with respect to said combination targets and transmitting means may be determined.

17. A system for determining the position of a mobile station with respect to a pair of spaced targets, the combination of:

(a) a rotary type directional antenna mounted at the station,
   (b) drive means for turning the antenna in a circle in a position to alternately scan the targets,
   (c) pulse type signal transmitting means,
   (d) signal receiving means,
   (e) a TR switch connecting the transmitting means and receiving means to the antenna for transmitting a pulse type signal from the antenna and, alternately, receiving signals reflected back to the antenna,
   (f) electronic time measuring means responsive to start and stop pulses for measuring the time therebetween and having a reset circuit, said time measuring means being characterized by being capable of holding a total count after receiving a stop pulse and not being responsive to subsequent start and stop pulses until reset,
   (g) means for sending a start pulse to the time measuring means each time a signal is transmitted from said transmitting means through the antenna,
   (h) an adjustable range control means connected to said transmitting and receiving means and to the time measuring means and responsive to said start pulses and reflected signals for sending a stop pulse to the time measuring means each time a reflected signal is received at a time interval after the occurrence of a start pulse which is substantially equal to the expected travel time of a signal reflected by either of the targets,
   (i) selector means connected to said drive means for energizing the range control means only when the antenna is directed toward one of said targets,
   (j) a reset generator connected to said range control means and the reset circuit of the time measuring means for resetting the time measuring means when reflected signals are being received which give rise to stop pulses by the range control means, and
   (k) means for registering said time measurements, from which the distance of the station from the targets and the precise position of the station may be determined.

18. A system as defined in claim 17 wherein said registering means comprises a map on which the positions of the targets are marked, a plotter arm associated with each of the targets having one end portion thereof pivotally supported over the mark on the map indicating the position of the respective target, said plotter arms being supported in crossing relation over the map, a slide on each plotter arm movable lengthwise along the respective plotter arm, a vertically extending connector journaled to each of said slides to move said slides in the same direction and pivot at least one of said arms when one of said slides is moved, means for moving each slide along the respective arm in accordance with the distance of the station from the respective target whereby the position of said connector continually indicates the position on the map of the station, and characterized further to include drive means connected to each of said plotter arms and the respective selector means associated with the same target for automatically adjusting said selector means in accordance with the pivoting movement of the respective plotter arm.

19. A system as defined in claim 17 wherein said selector means includes a switch operating cam associated with each of the targets, drive means for turning said cams simultaneously with rotation of the antenna, the relative angular positions of said cams being adjustable to the relative azimuths of the targets with respect to the station, and characterized further to include a compass means connected to the cam drive means for maintaining a constant relation of the relative positions of the cams with respect to a given geographical direction.

(References on following page)

References Cited by the Examiner

UNITED STATES PATENTS

| | | | |
|---|---|---|---|
| 2,311,650 | 2/43 | Elm | 343—112 |
| 2,405,239 | 8/46 | Seeley | 343—15 |
| 2,422,025 | 6/47 | Luck | 343—112 |
| 2,461,005 | 2/49 | Southworth | 343—18 |
| 2,472,212 | 6/49 | Hudspeth | 343—18 |
| 2,508,565 | 5/50 | Chance | 343—15 |
| 2,644,156 | 6/53 | Schneider | 343—13 |
| 2,659,883 | 11/53 | Haake | 343—7.4 |
| 2,702,367 | 2/55 | Ergen | 343—13 |
| 2,709,804 | 5/55 | Chance et al. | 343—7.3 |
| 2,738,461 | 3/56 | Burbeck et al. | 343—13 |
| 2,746,034 | 5/56 | Hasbrook | 343—15 |
| 2,911,642 | 11/59 | Hickley et al. | 343—15 |
| 2,912,686 | 11/59 | Dodinton et al. | 343—7.3 |
| 2,922,156 | 1/60 | Kimball | 343—7.3 |
| 2,996,711 | 8/61 | Heiser | 343—112 |

CHESTER L. JUSTUS, *Primary Examiner.*

FREDERICK M. STRADER, *Examiner.*